US012591121B2

(12) United States Patent
Koida

(10) Patent No.: US 12,591,121 B2
(45) Date of Patent: Mar. 31, 2026

(54) ZOOM OPTICAL SYSTEM, OPTICAL APPARATUS, AND METHOD FOR MANUFACTURING ZOOM OPTICAL SYSTEM

(71) Applicant: Nikon Corporation, Tokyo (JP)

(72) Inventor: Keigo Koida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 368 days.

(21) Appl. No.: 18/029,910

(22) PCT Filed: Dec. 2, 2021

(86) PCT No.: PCT/JP2021/044213
§ 371 (c)(1),
(2) Date: Apr. 1, 2023

(87) PCT Pub. No.: WO2022/124184
PCT Pub. Date: Jun. 16, 2022

(65) Prior Publication Data
US 2023/0367109 A1    Nov. 16, 2023

(30) Foreign Application Priority Data

Dec. 10, 2020    (JP) ................................. 2020-204753

(51) Int. Cl.
*G02B 15/20* (2006.01)
*G02B 15/14* (2006.01)
*G02B 27/64* (2006.01)

(52) U.S. Cl.
CPC ......... *G02B 15/20* (2013.01); *G02B 15/1461* (2019.08); *G02B 27/646* (2013.01)

(58) Field of Classification Search
CPC .... G02B 15/143101; G02B 15/143105; G02B 15/144101; G02B 15/144105;
(Continued)

(56) References Cited

U.S. PATENT DOCUMENTS 5,272,564 A    12/1993 Suzuki et al.
5,831,768 A  *  11/1998 Ohtake .......... G02B 15/145113
                                                  359/557
(Continued)

FOREIGN PATENT DOCUMENTS

CN    114063270 A    7/2020
JP    H04-191811 A    7/1992
(Continued)

OTHER PUBLICATIONS

International Search Report from International Patent Application No. PCT/JP2021/044213, Feb. 22, 2022.
(Continued)

*Primary Examiner* — Nicholas R. Pasko
(74) *Attorney, Agent, or Firm* — Potomac Law Group, PLLC

(57)    ABSTRACT

A zoom optical system that can achieve size and weight reduction and has high optical performance, an optical apparatus, and a method for manufacturing the zoom optical system are provided.
A zoom optical system GL used in an optical apparatus such as a camera 1 includes a first lens group G1 having positive refractive power and disposed closest to an object side, a second lens group G2, and a rear lens group GL, spaces between the lens groups change at zooming, the first lens group G1 includes a positive lens L11 closest to the object side, and the zoom optical system satisfies a condition expressed by an expression below, $$0.30 < D1MAX/G1d < 0.70$$

in the expression,
D1MAX: maximum air space on an optical axis in the first lens group G1, and
G1d: thickness of the first lens group G1 on the optical axis.

19 Claims, 26 Drawing Sheets

(58) Field of Classification Search
CPC .... G02B 15/144109; G02B 15/144113; G02B
15/145101; G02B 15/145105; G02B
15/145109; G02B 15/145113; G02B
15/145117; G02B 15/145121; G02B
15/145125; G02B 15/145129; G02B
15/1461; G02B 27/646
See application file for complete search history.

(56) References Cited

U.S. PATENT DOCUMENTS

| | | | |
|---|---|---|---|
| 2012/0320251 A1* | 12/2012 | Saito | G02B 15/173 |
| | | | 359/683 |
| 2015/0205082 A1 | 7/2015 | Shiokawa | |
| 2016/0109690 A1* | 4/2016 | Ogata | G02B 13/02 |
| | | | 359/557 |
| 2017/0108676 A1* | 4/2017 | Hori | G02B 15/1461 |
| 2017/0276917 A1 | 9/2017 | Iwamoto | |
| 2020/0132974 A1* | 4/2020 | Kimura | H04N 23/69 |
| 2020/0166735 A1* | 5/2020 | Kawamura | G02B 15/145121 |
| 2022/0035144 A1* | 2/2022 | Iwamoto | G02B 15/20 |

FOREIGN PATENT DOCUMENTS

| | | |
|---|---|---|
| JP | 2014-044319 A | 3/2014 |
| JP | 2015-135392 A | 7/2015 |
| JP | 2016-080824 A | 5/2016 |
| JP | 2017-173680 A | 9/2017 |
| JP | 2021-096331 A | 6/2021 |

OTHER PUBLICATIONS

Office Action issued Jan. 19, 2024, in Japanese Patent Application No. 2022-568230.
Office Action issued Sep. 29, 2023, in Japanese Patent Application No. 2022-568230.
Written Opinion of the International Searching Authority from International Patent Application No. PCT/JP2021/044213, Feb. 22, 2022.
Office Action issued Jun. 28, 2025, in Chinese Patent Application No. 202180067643.6.
Office Action issued Jun. 6, 2025, in Japanese Patent Application No. 2024-102040.

* cited by examiner

[FIG.1]
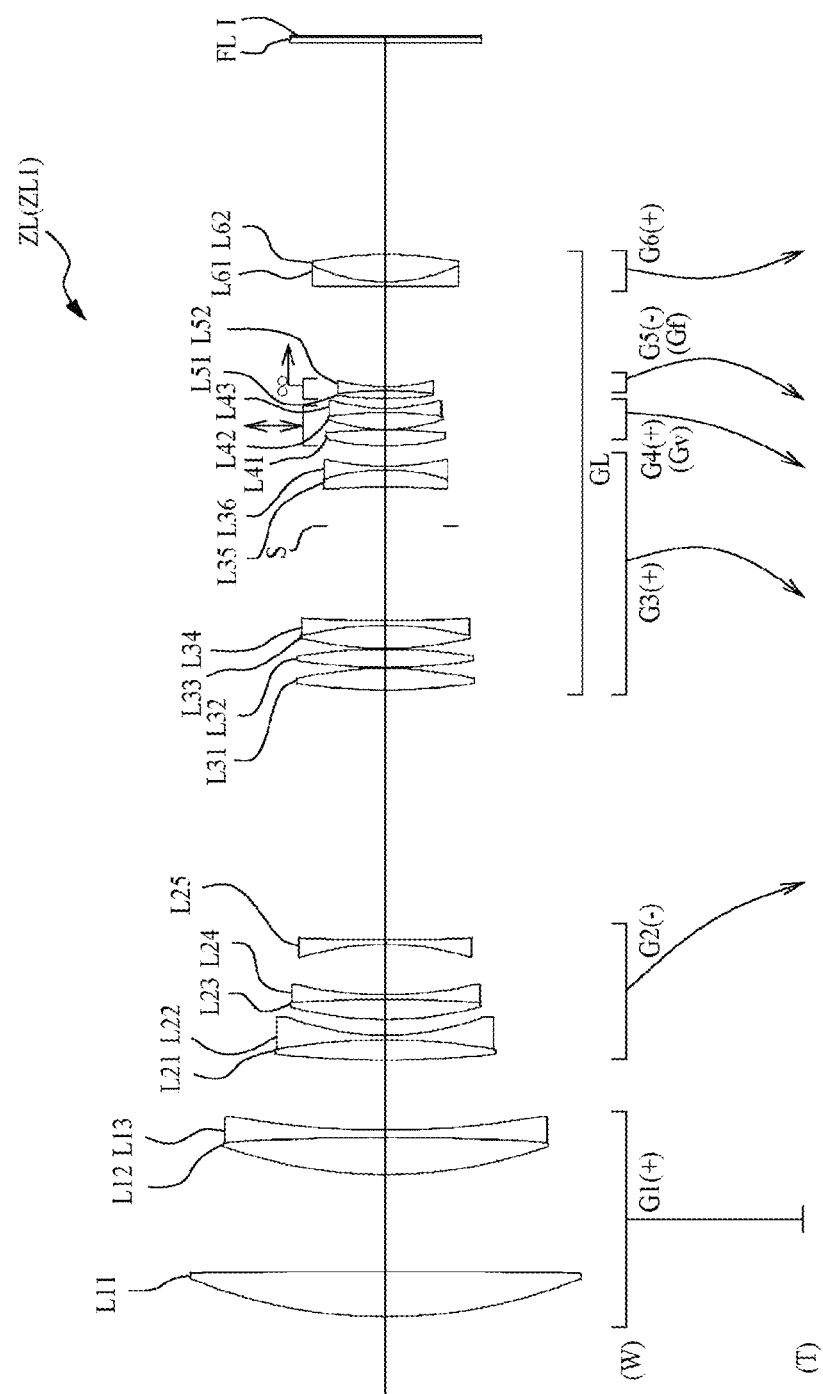

[FIG. 2(a)]
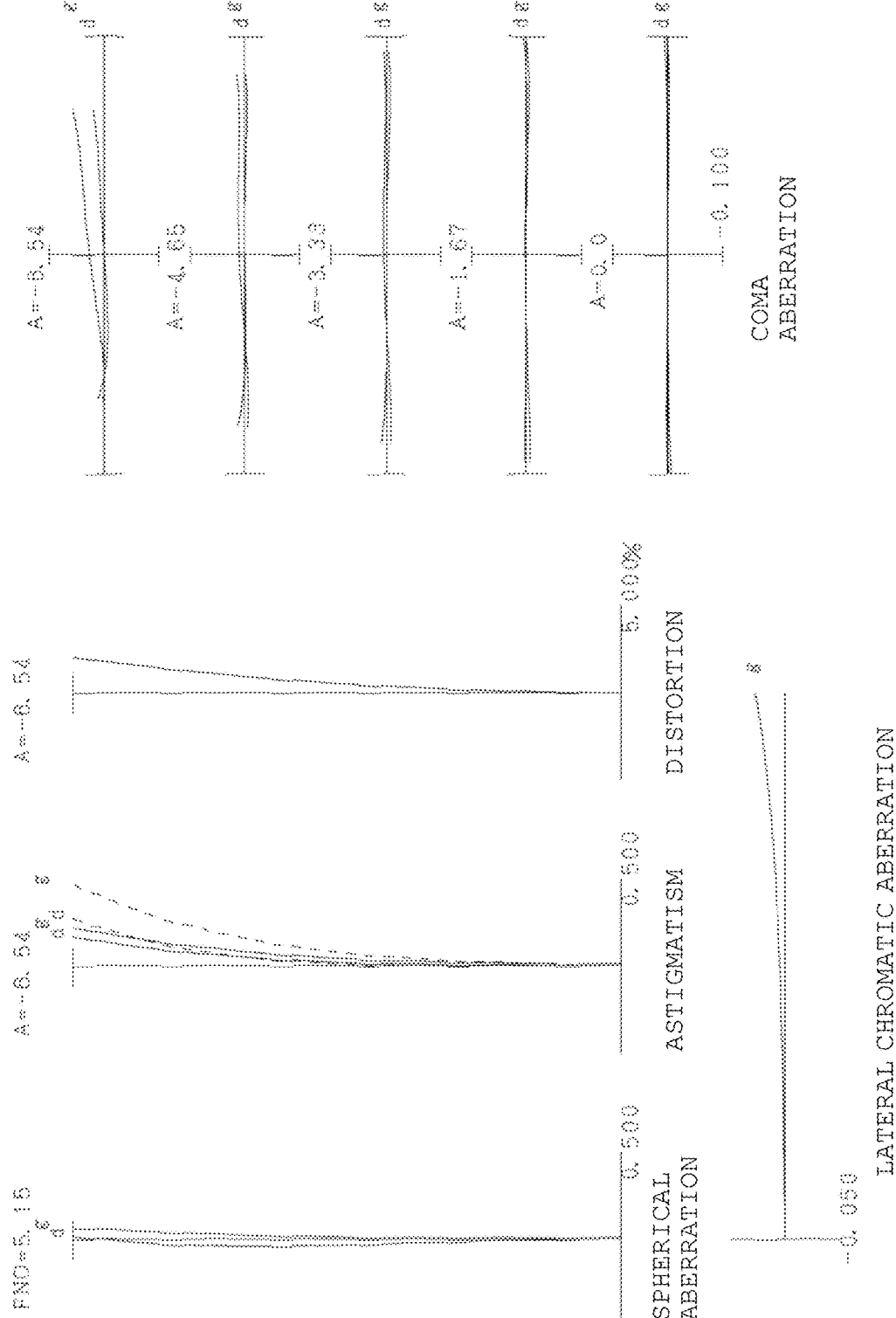

[FIG. 2(b)]
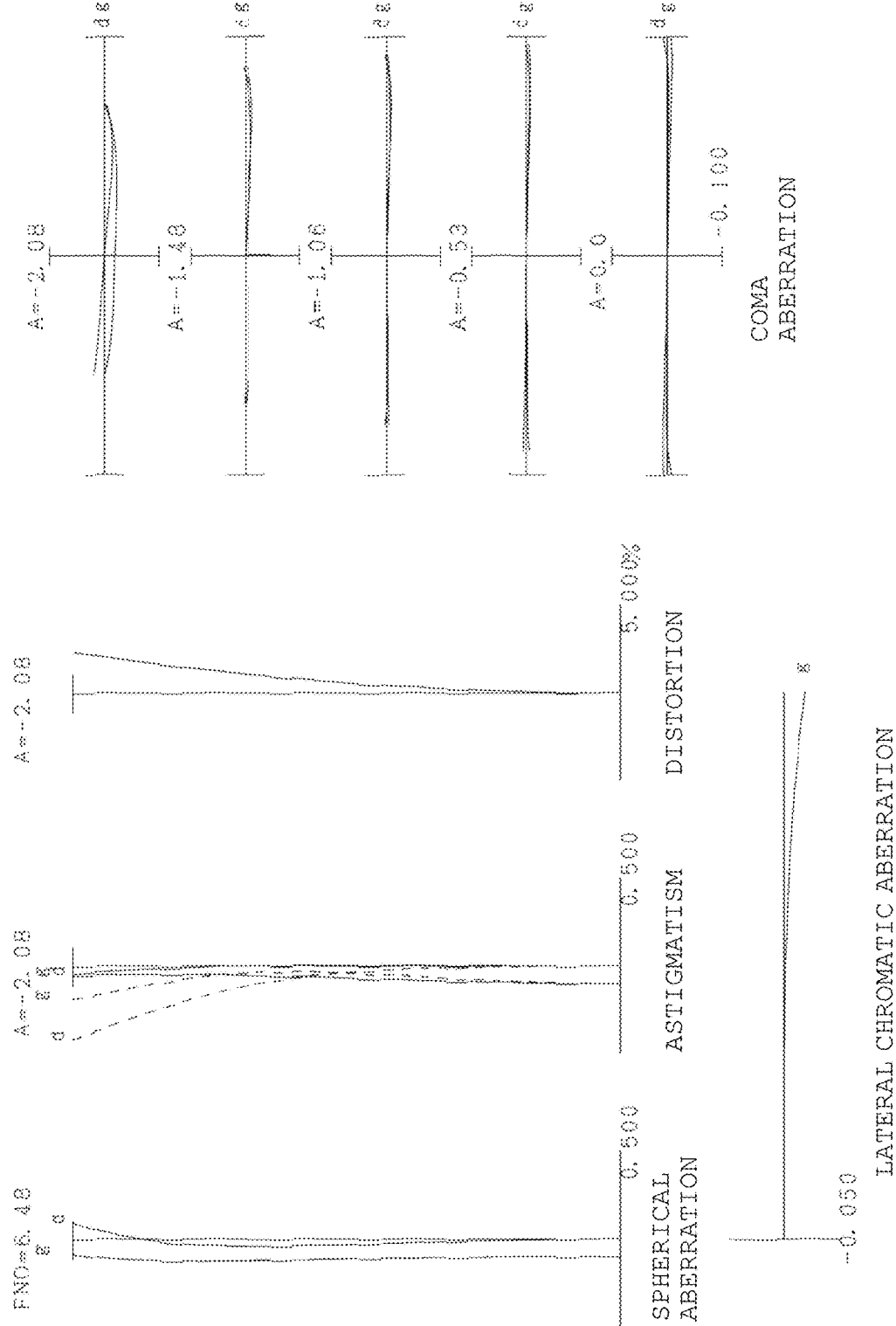

[FIG. 3]
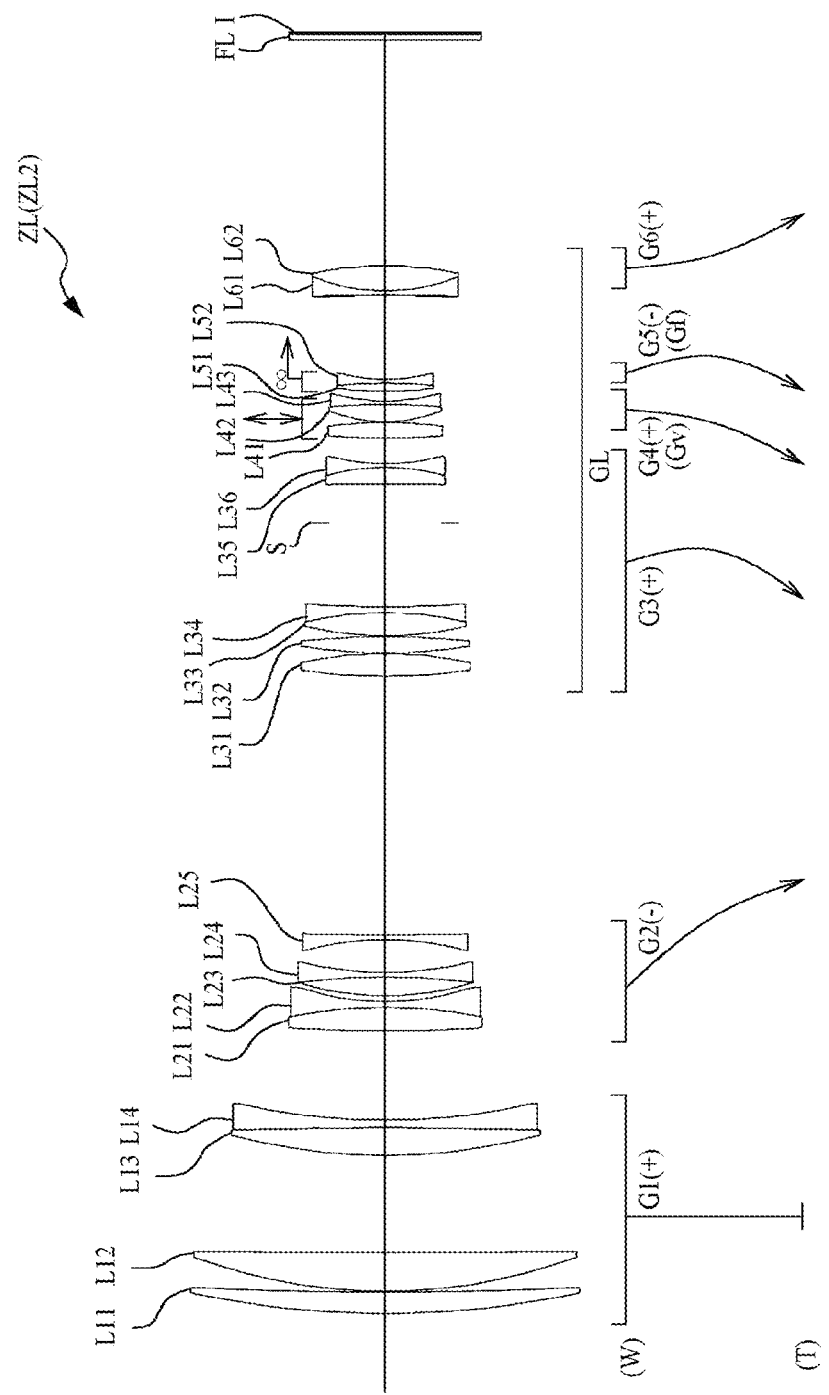

[FIG. 4(a)]
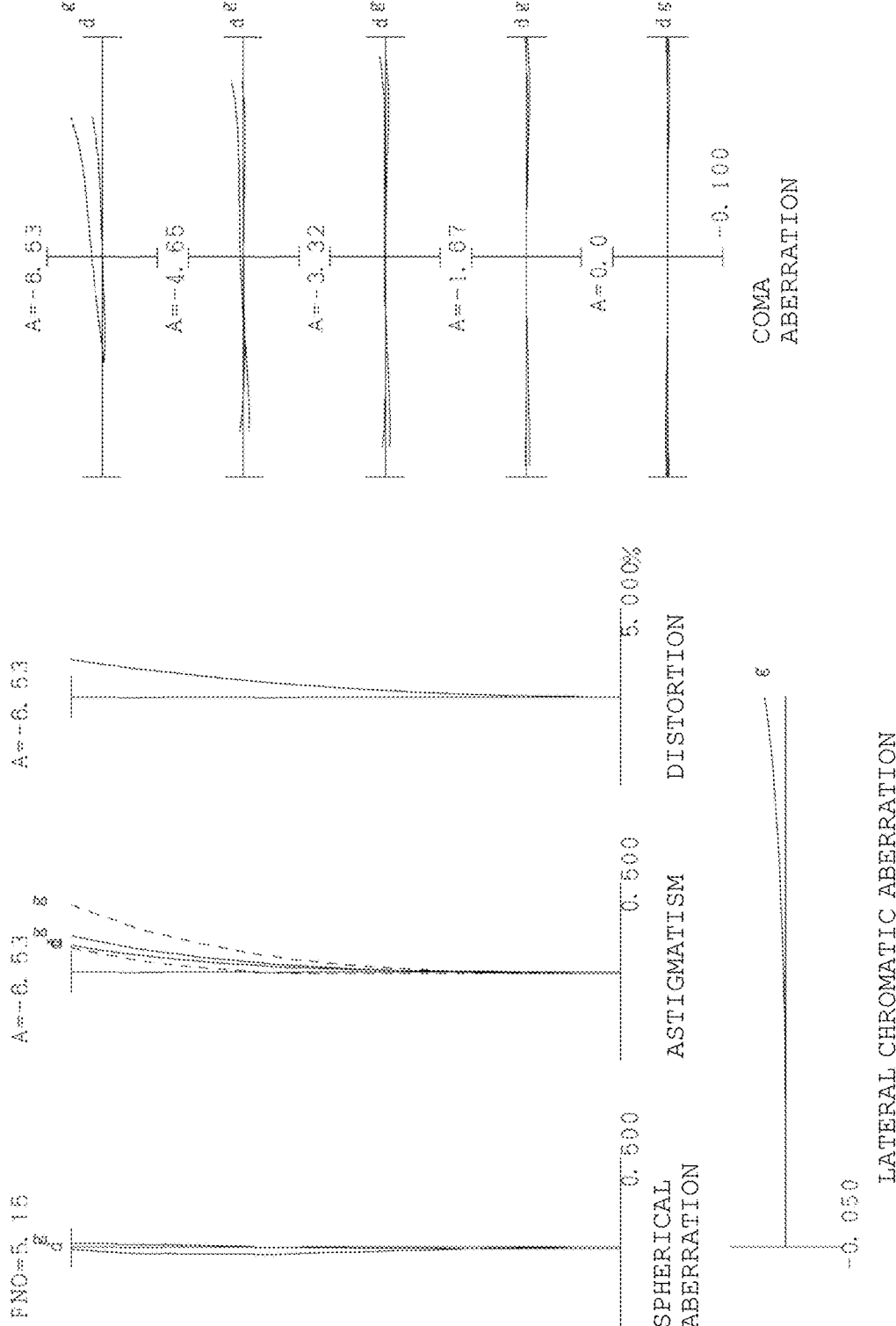

[FIG. 4(b)]
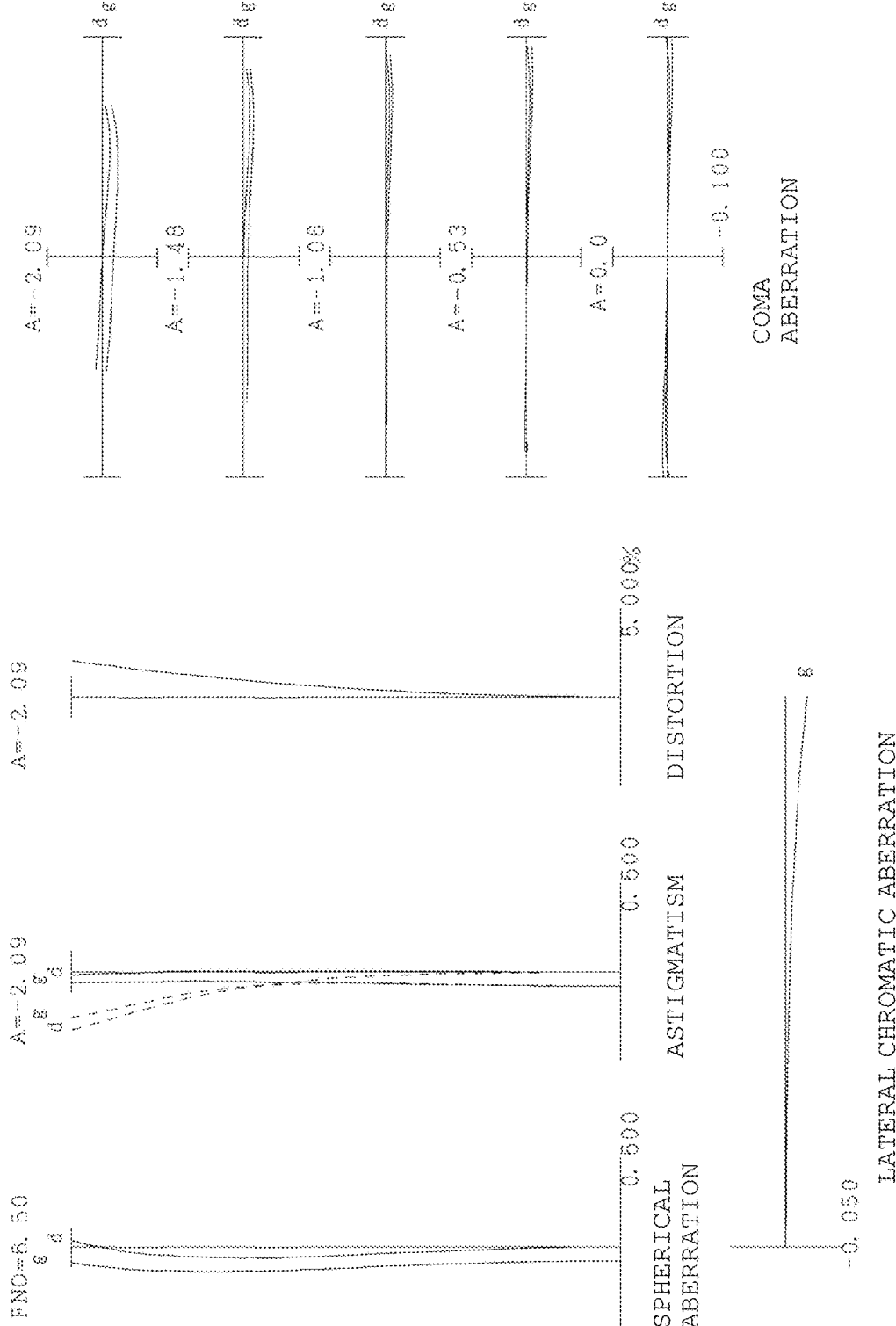

[FIG. 5]
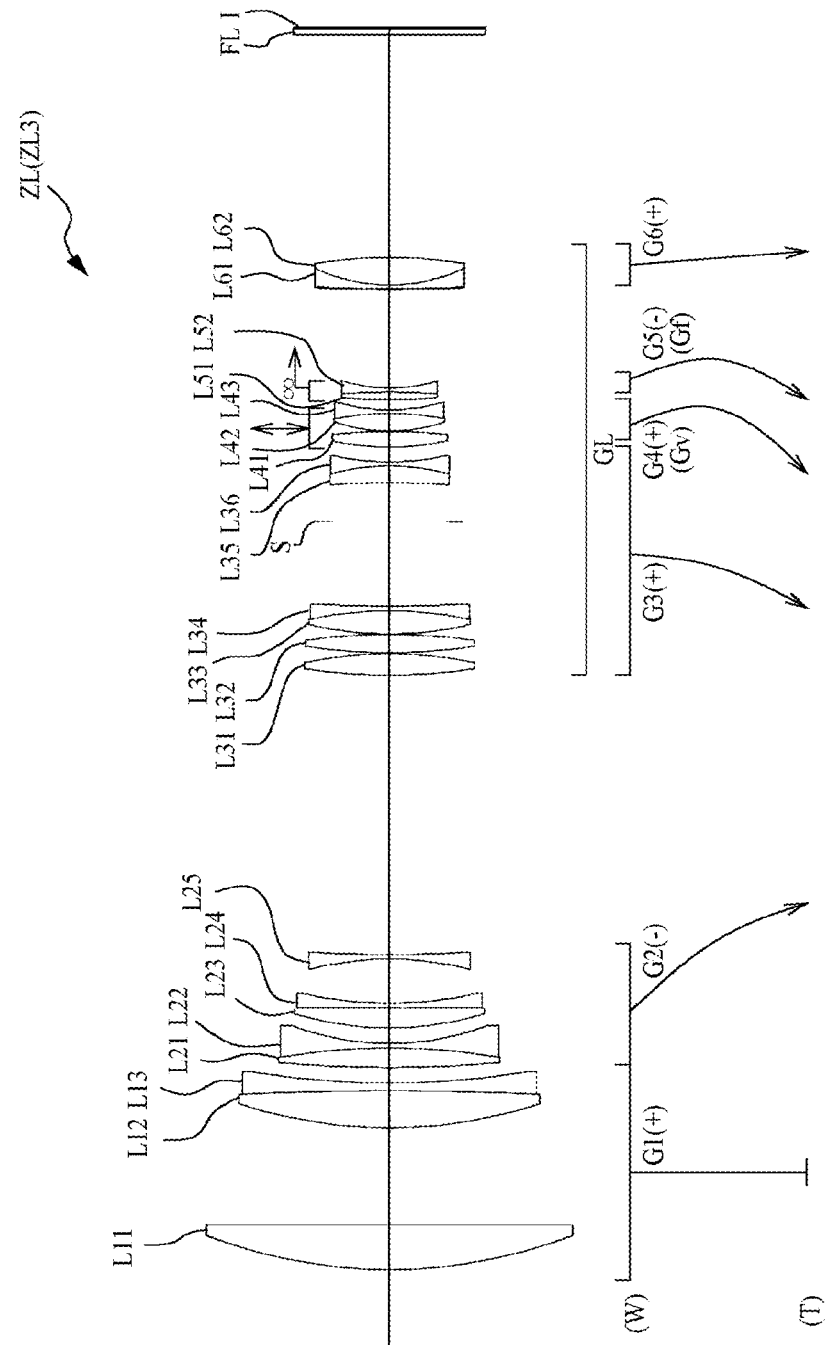

[FIG.6(a)]
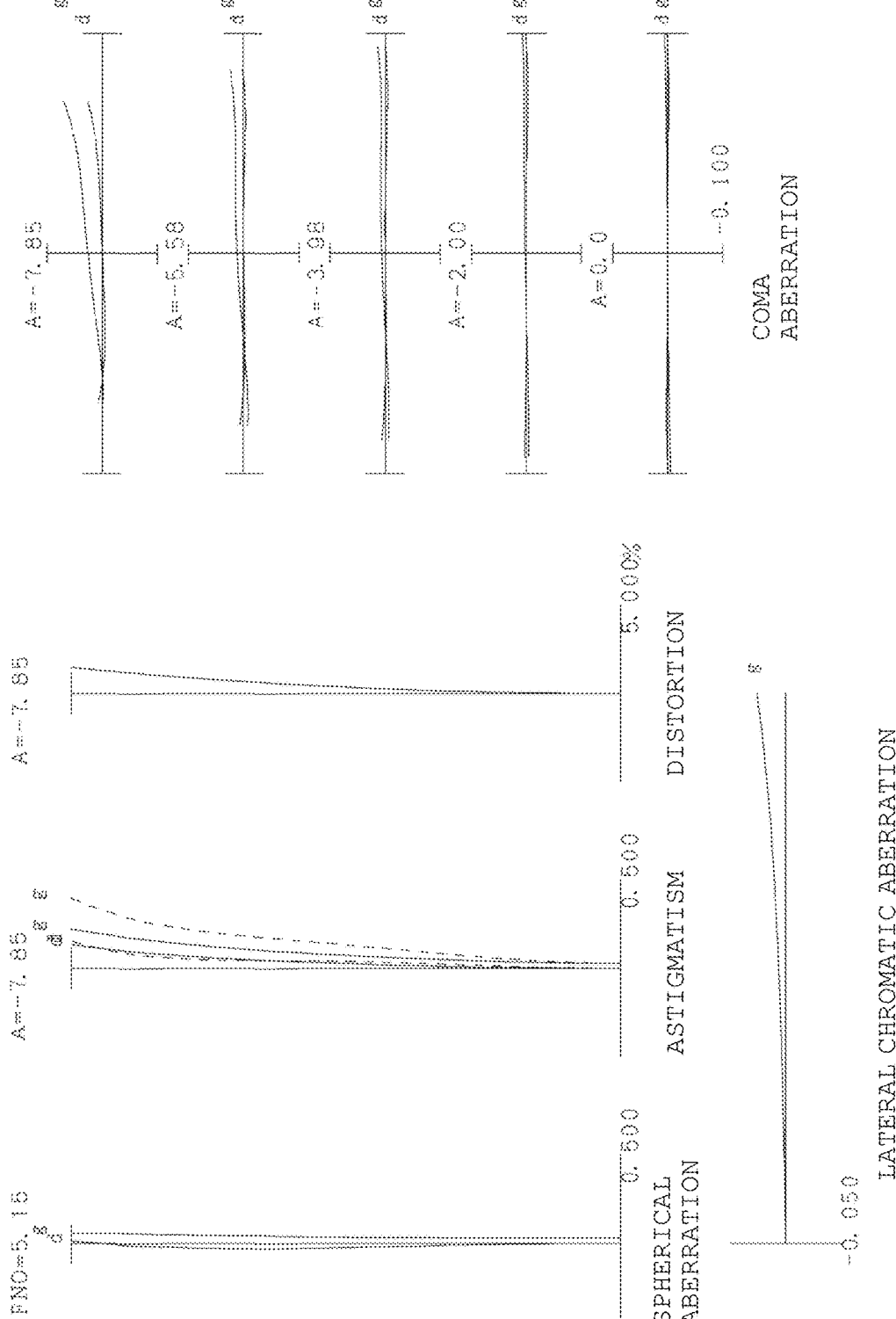

[FIG. 6(b)]
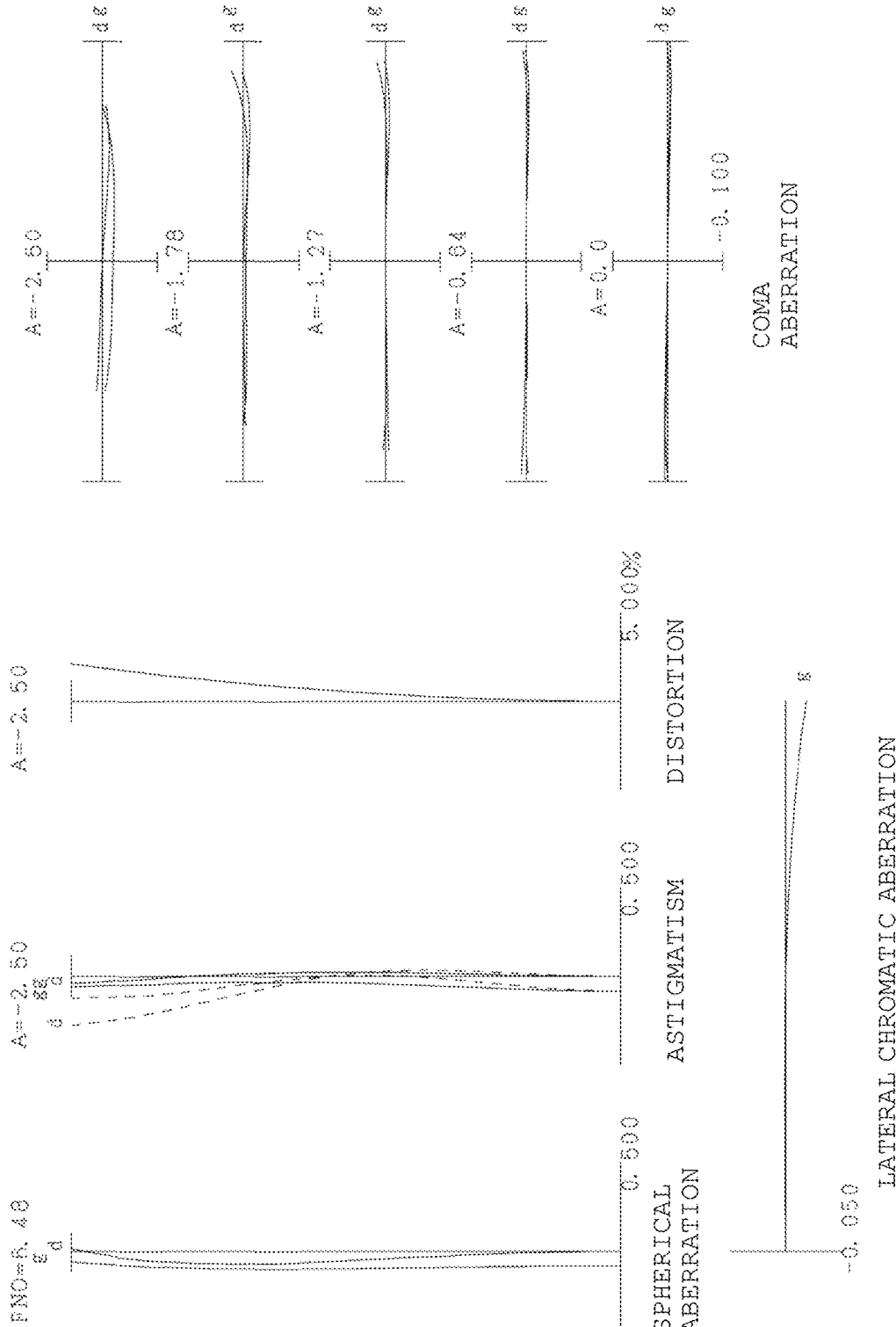

[FIG. 7]
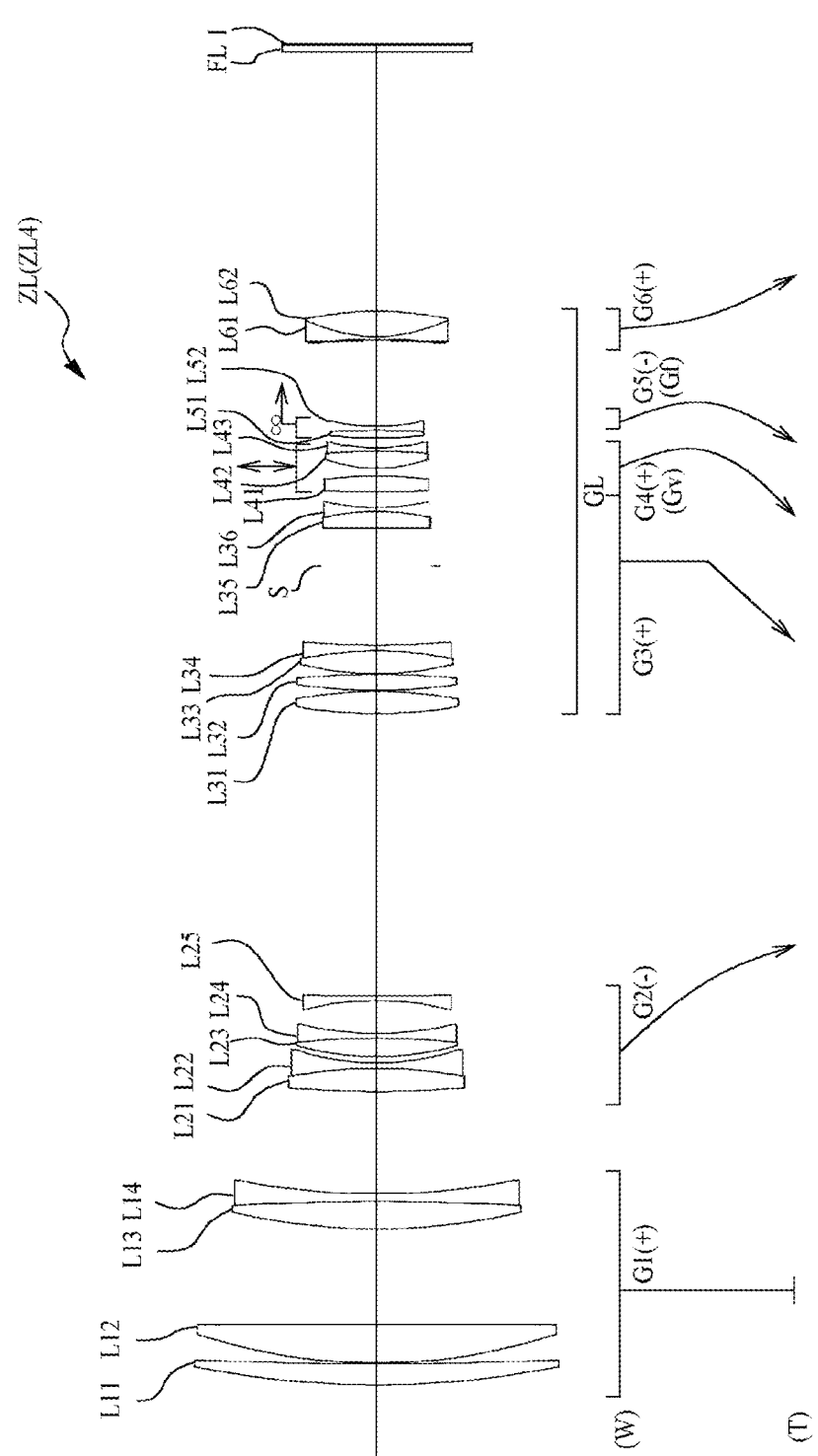

[FIG.8(a)]
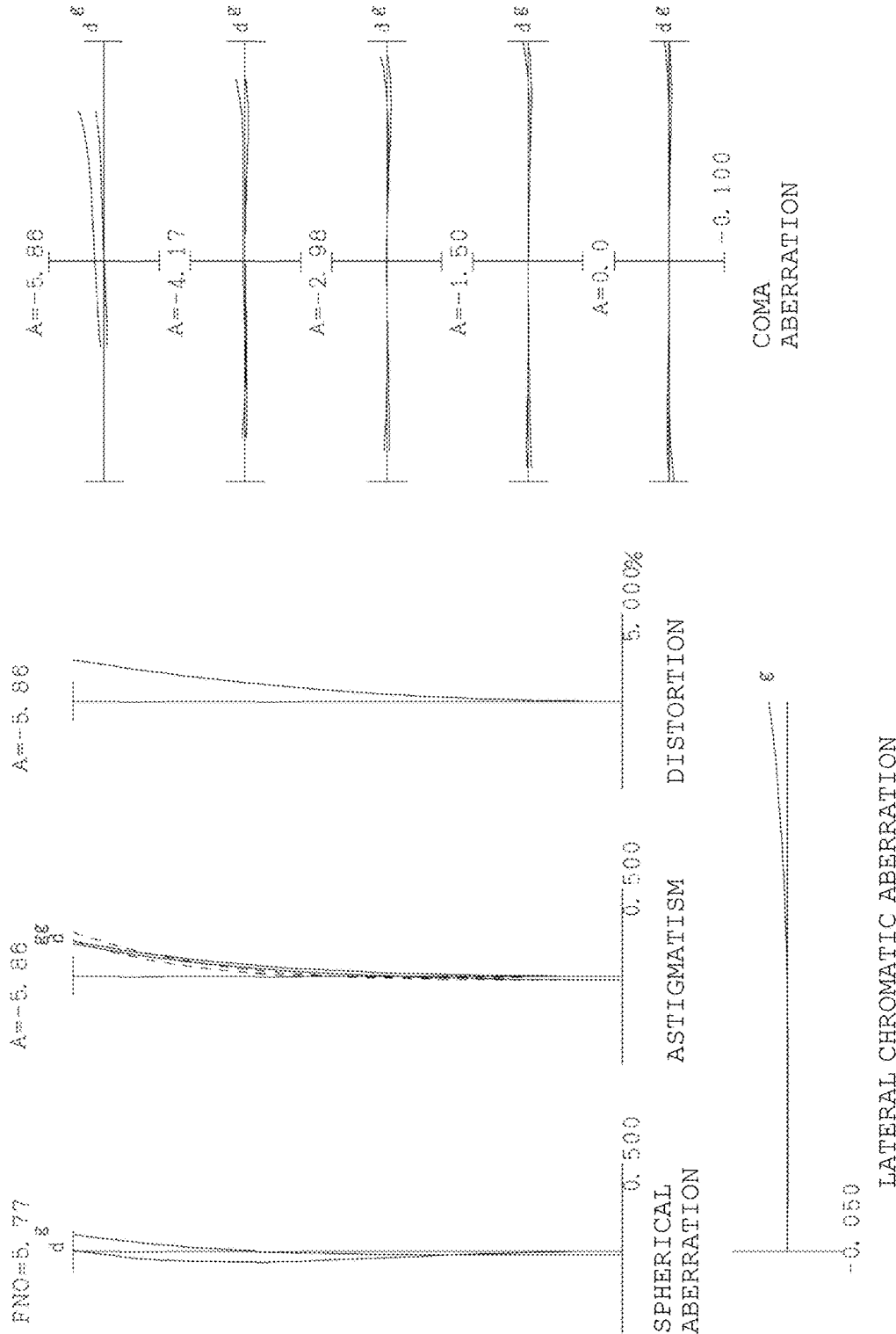

[FIG.8(b)]
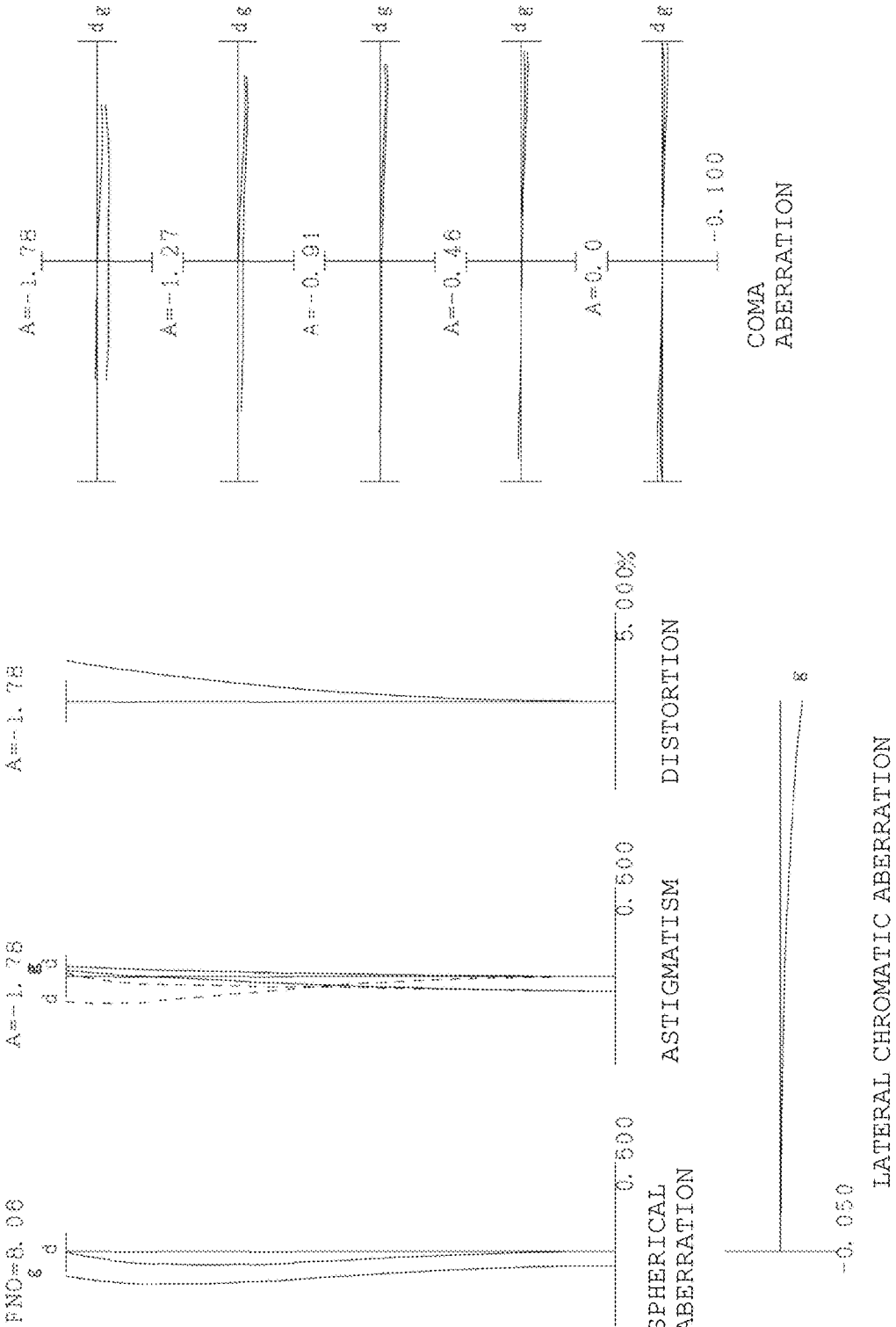
SPHERICAL ABERRATION
ASTIGMATISM
DISTORTION
LATERAL CHROMATIC ABERRATION
COMA ABERRATION

[FIG. 9]
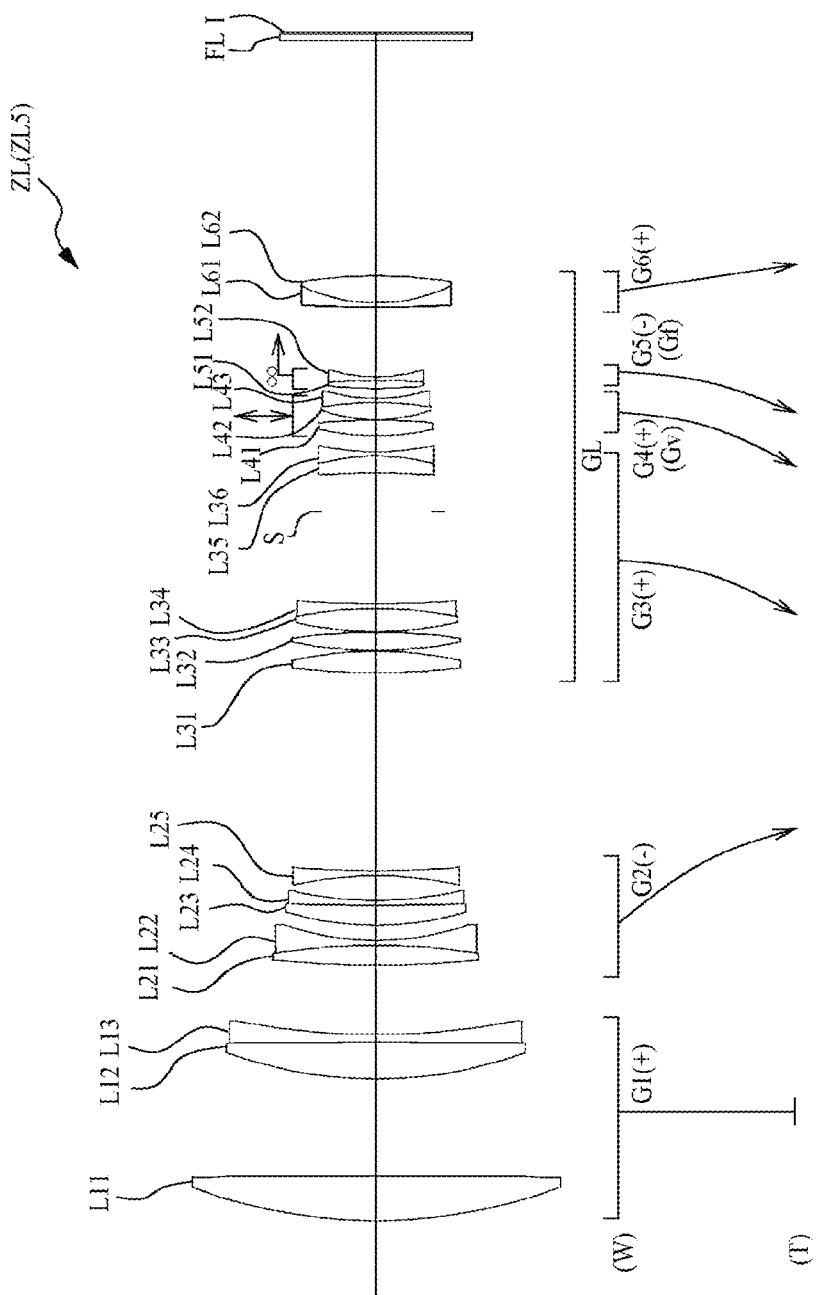

[FIG.10(a)]
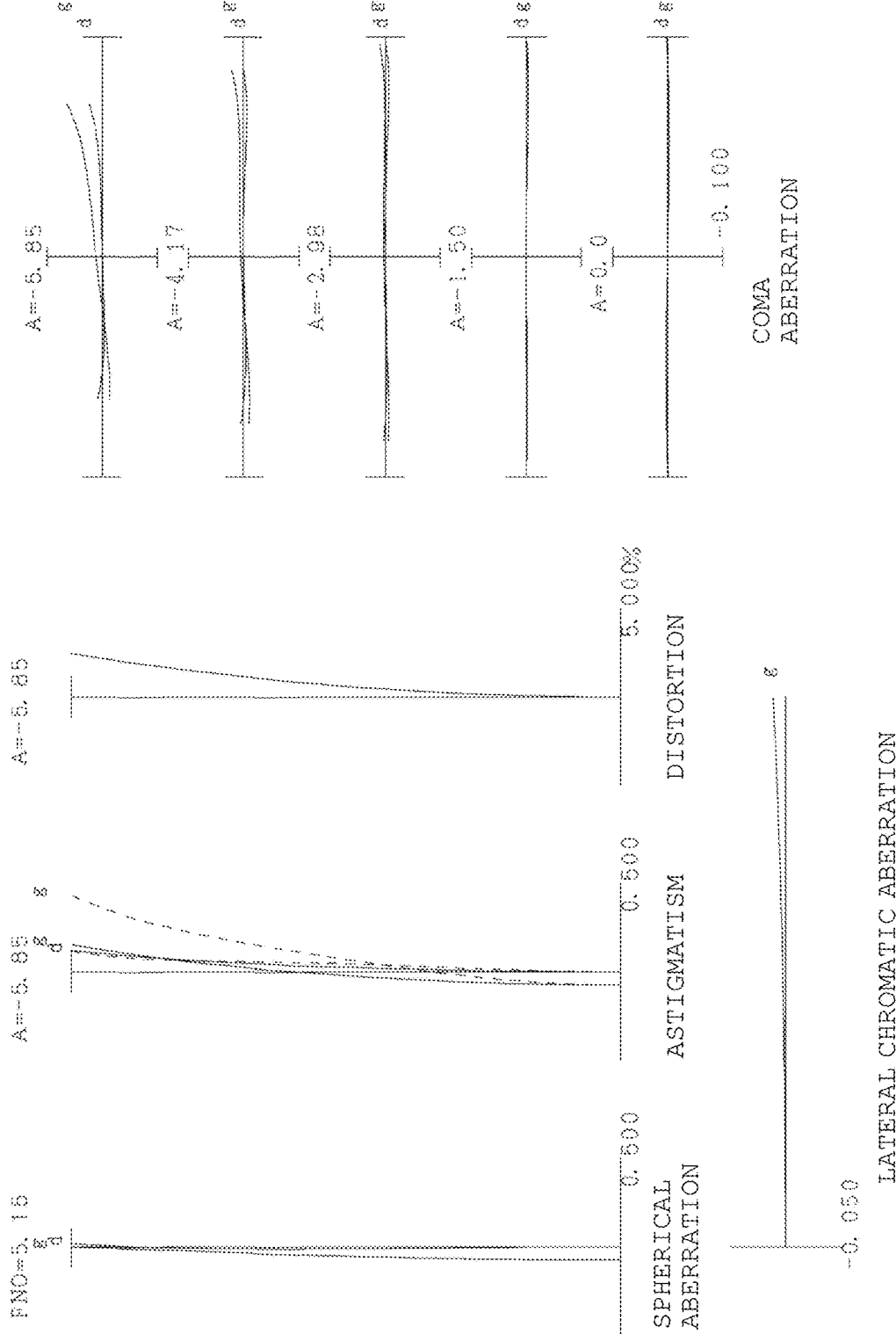

[FIG. 10 (b)]
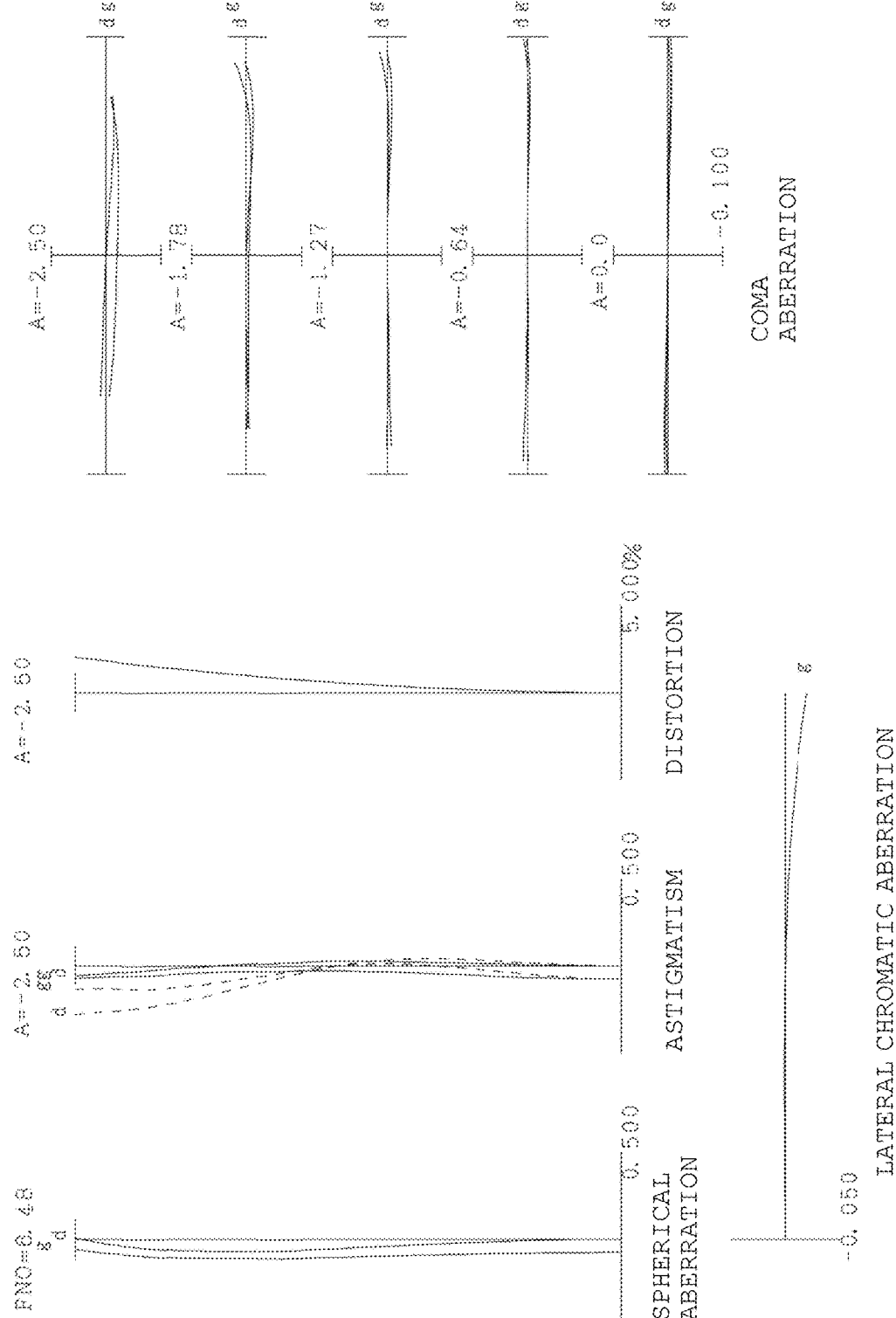

[FIG. 11]
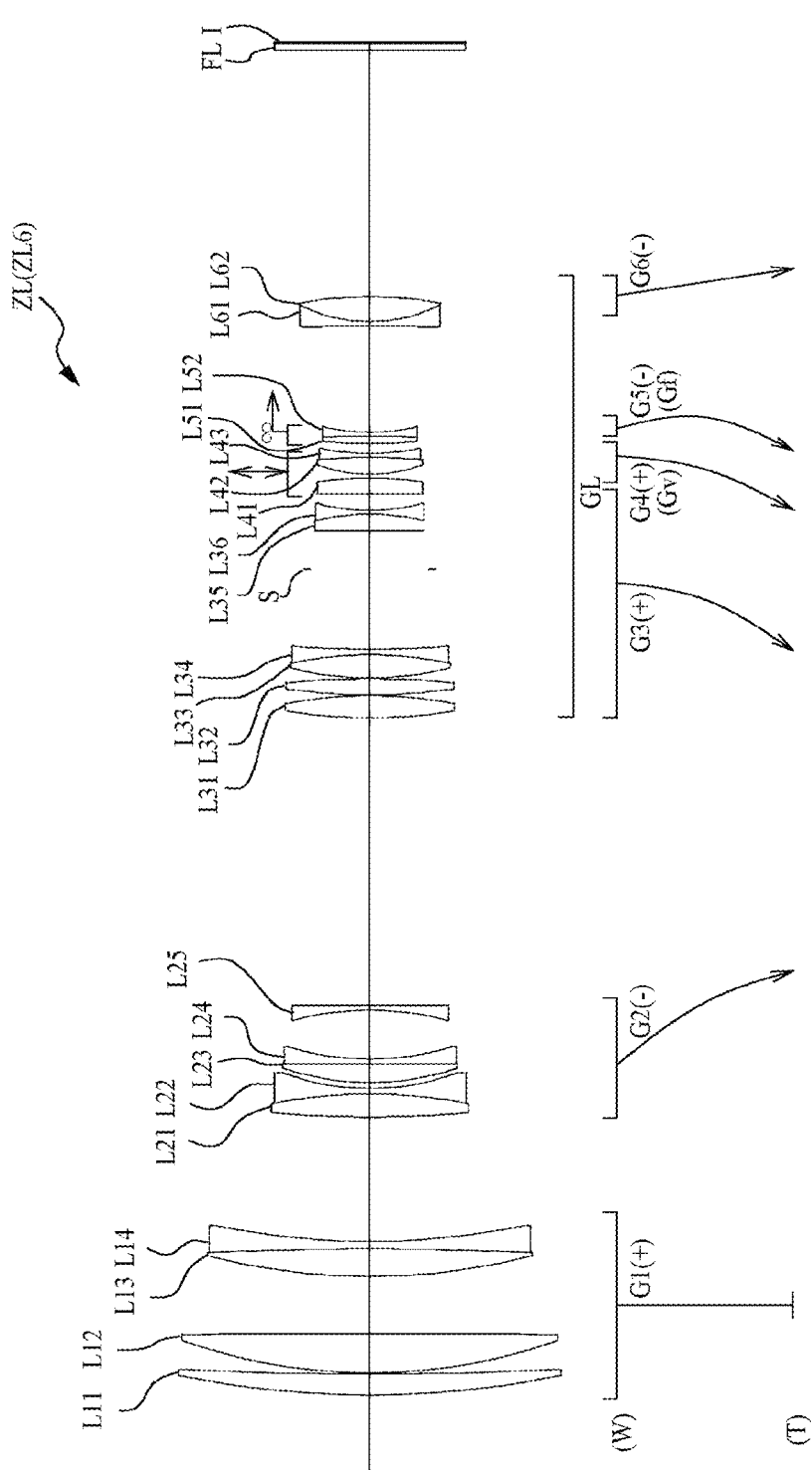

[FIG.12(a)]
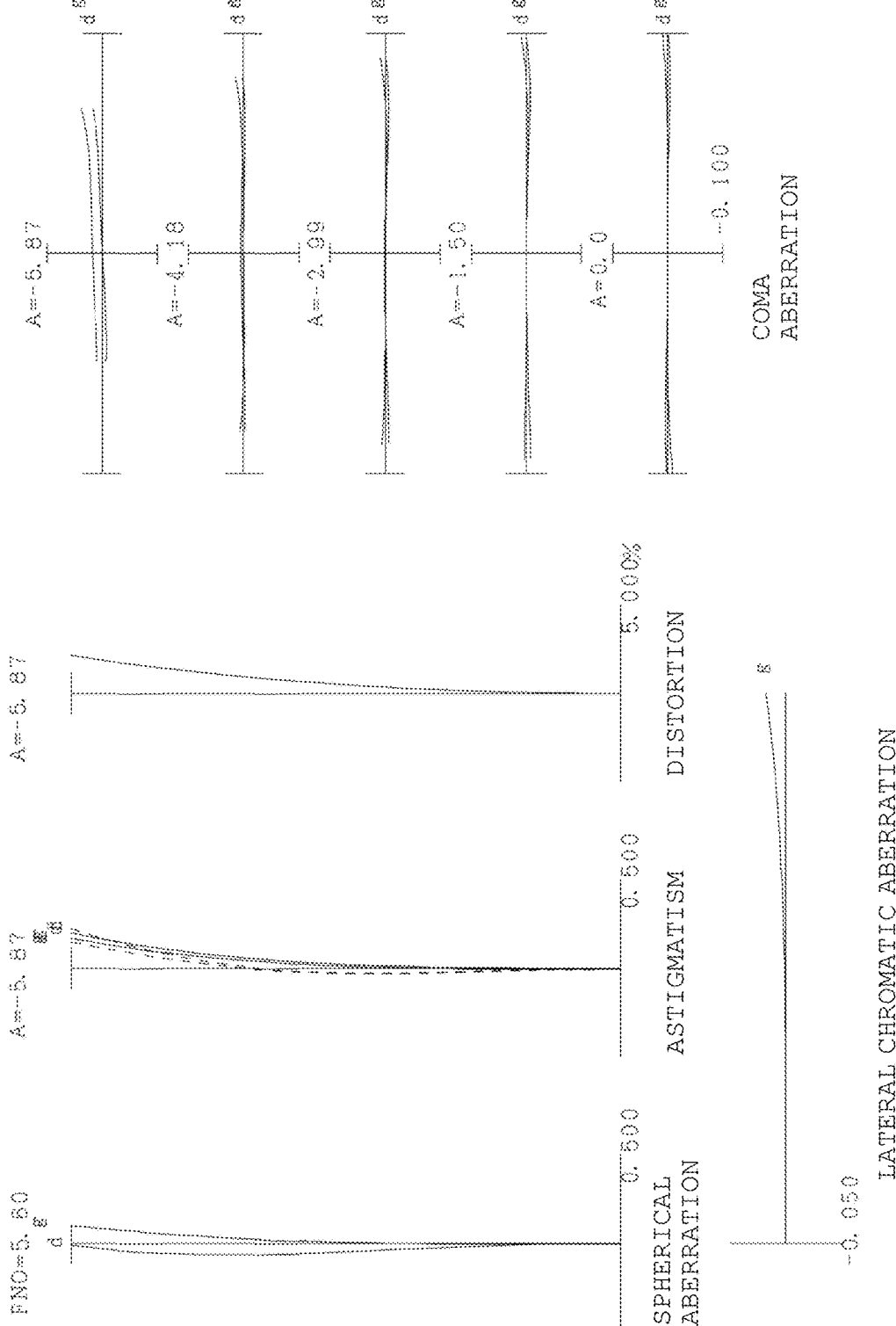

[FIG.12 (b)]
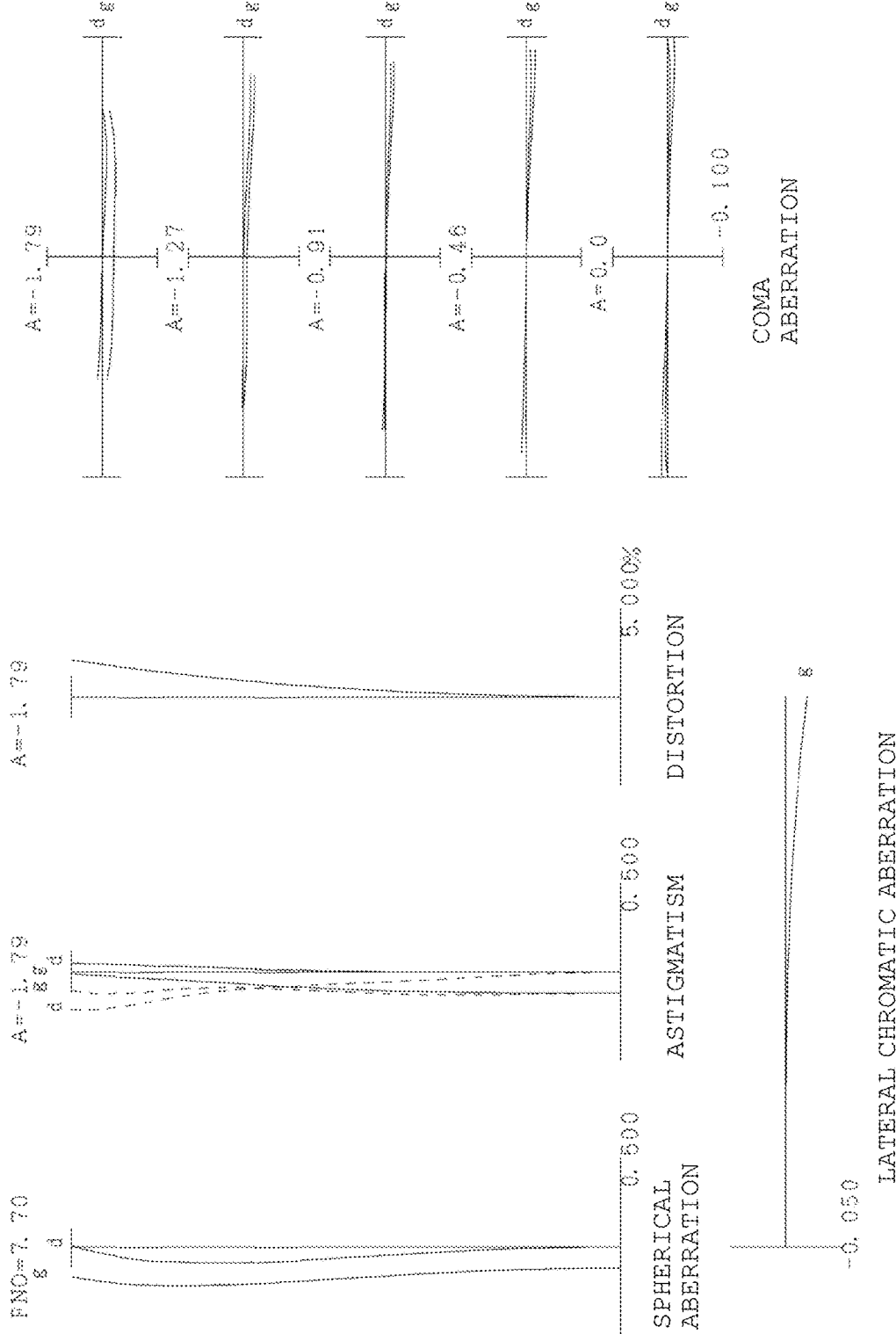

[FIG.13]
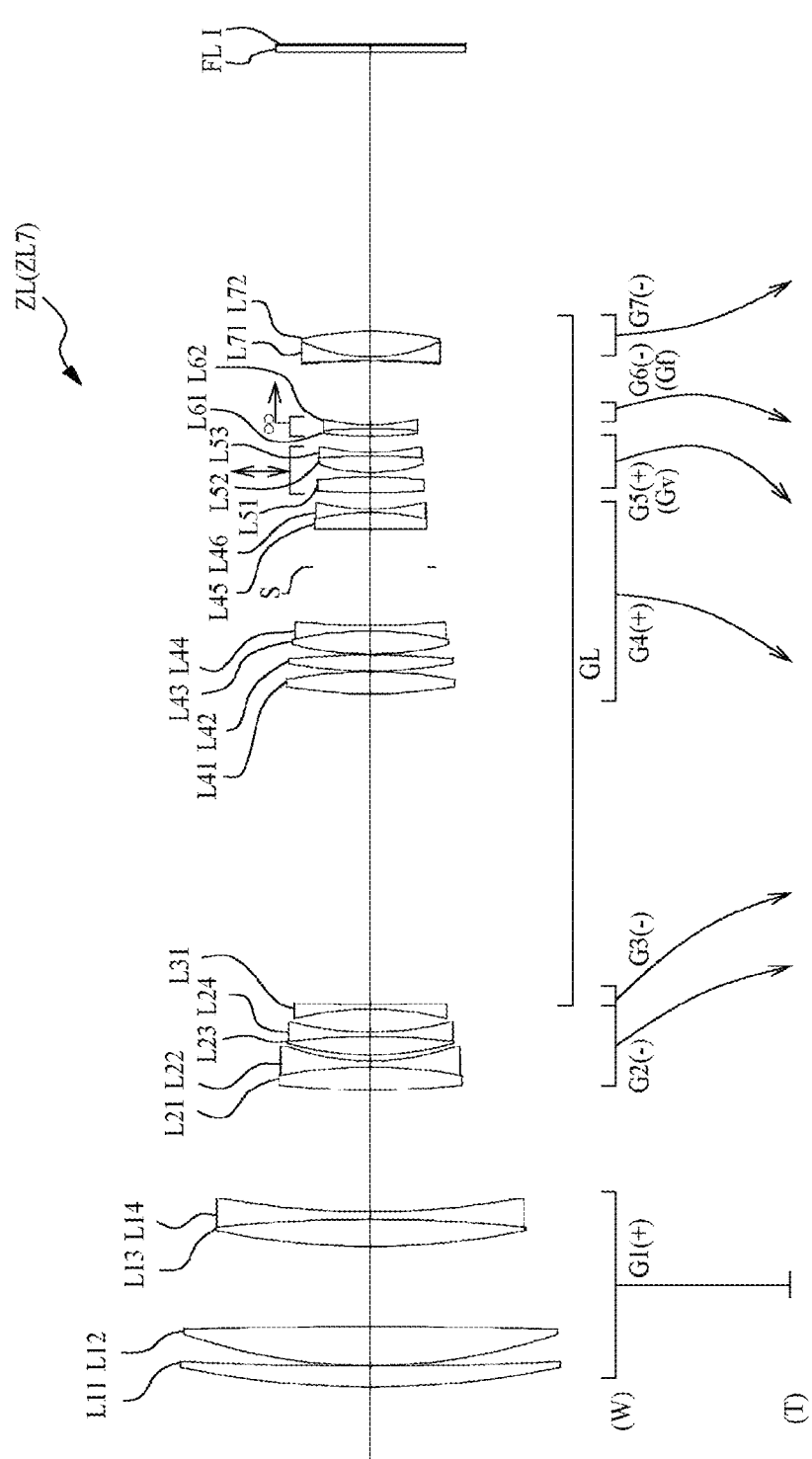

[FIG.14(a)]
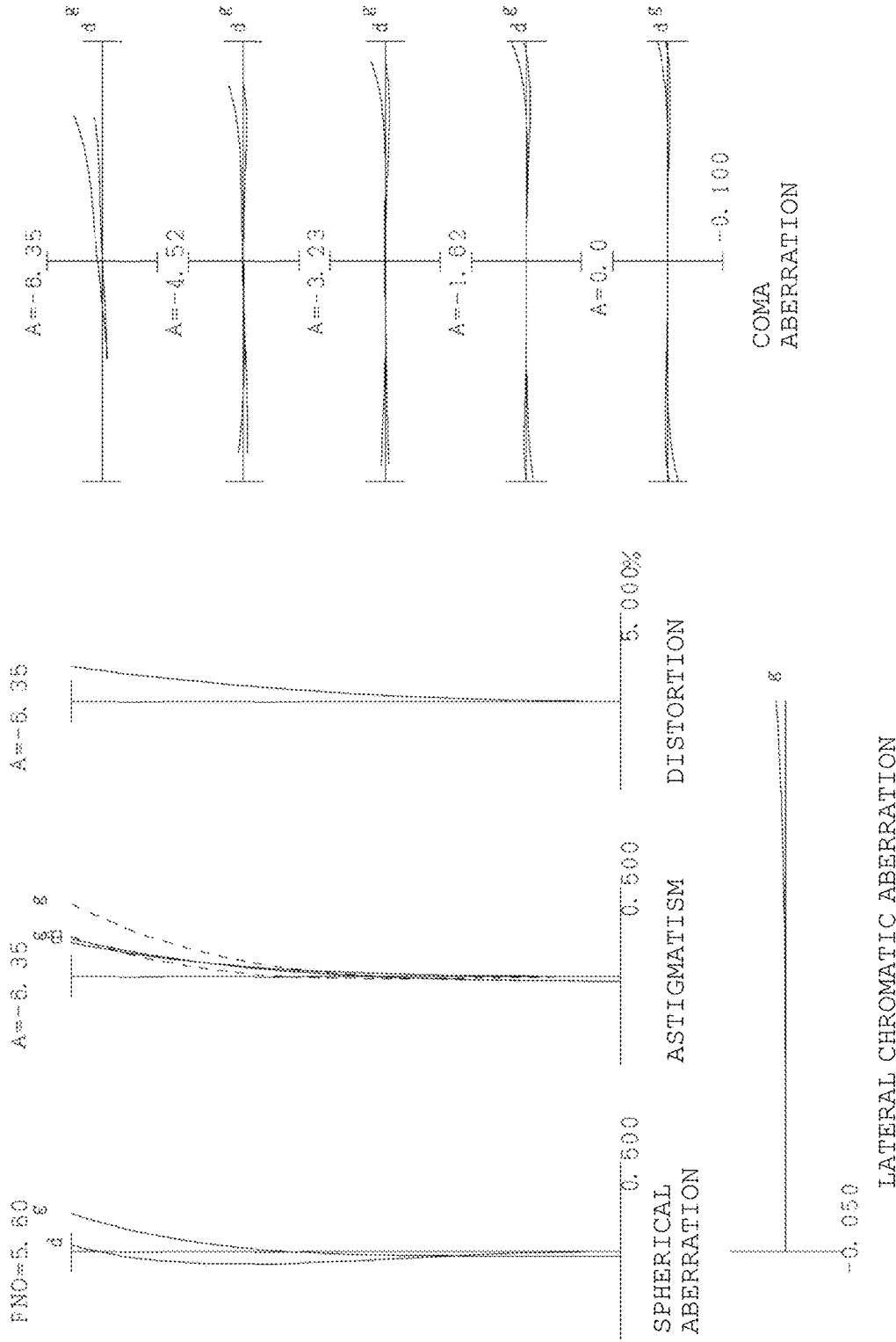
SPHERICAL ABERRATION
ASTIGMATISM
DISTORTION
LATERAL CHROMATIC ABERRATION
COMA ABERRATION

[FIG. 14 (b)]
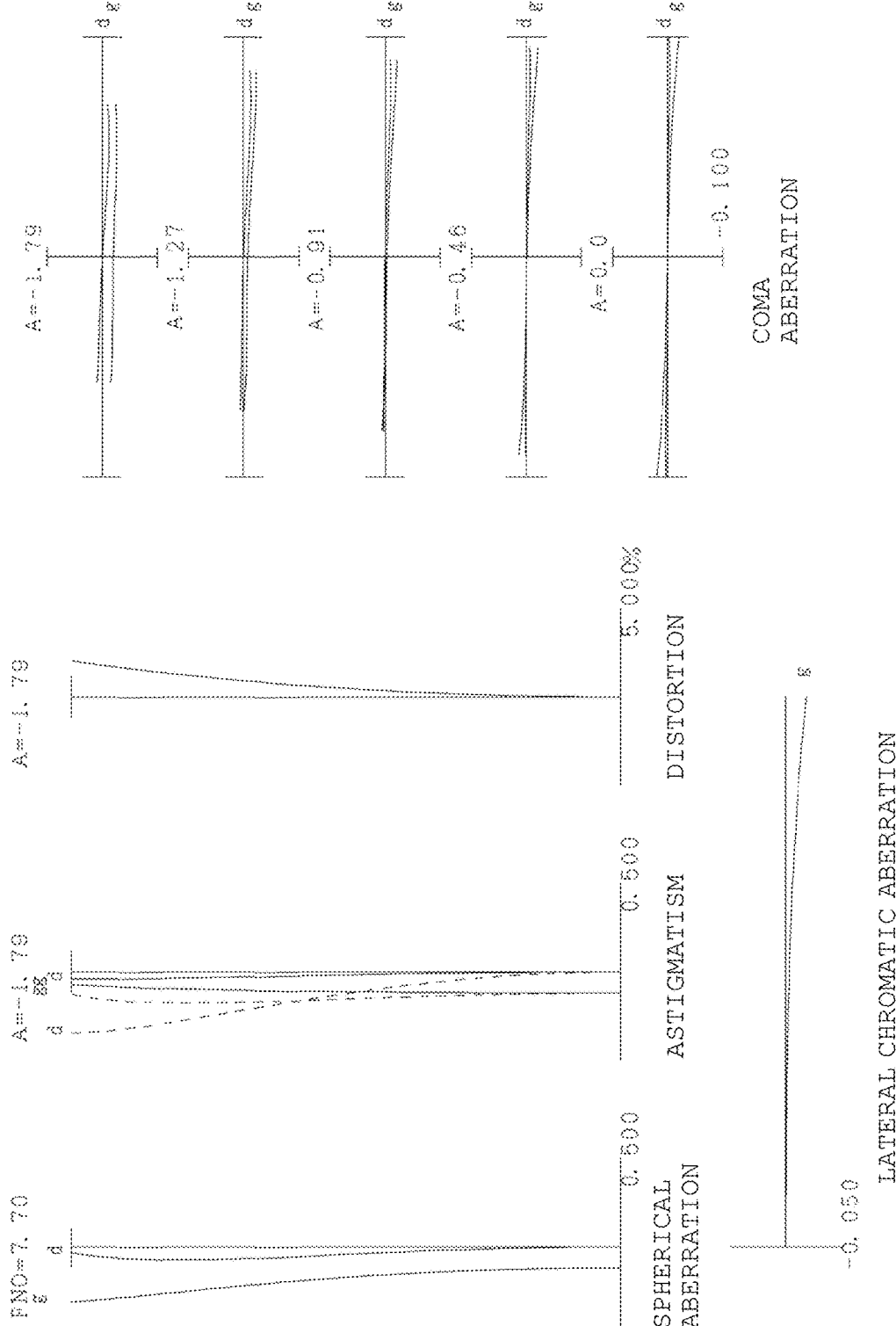

[FIG. 15]
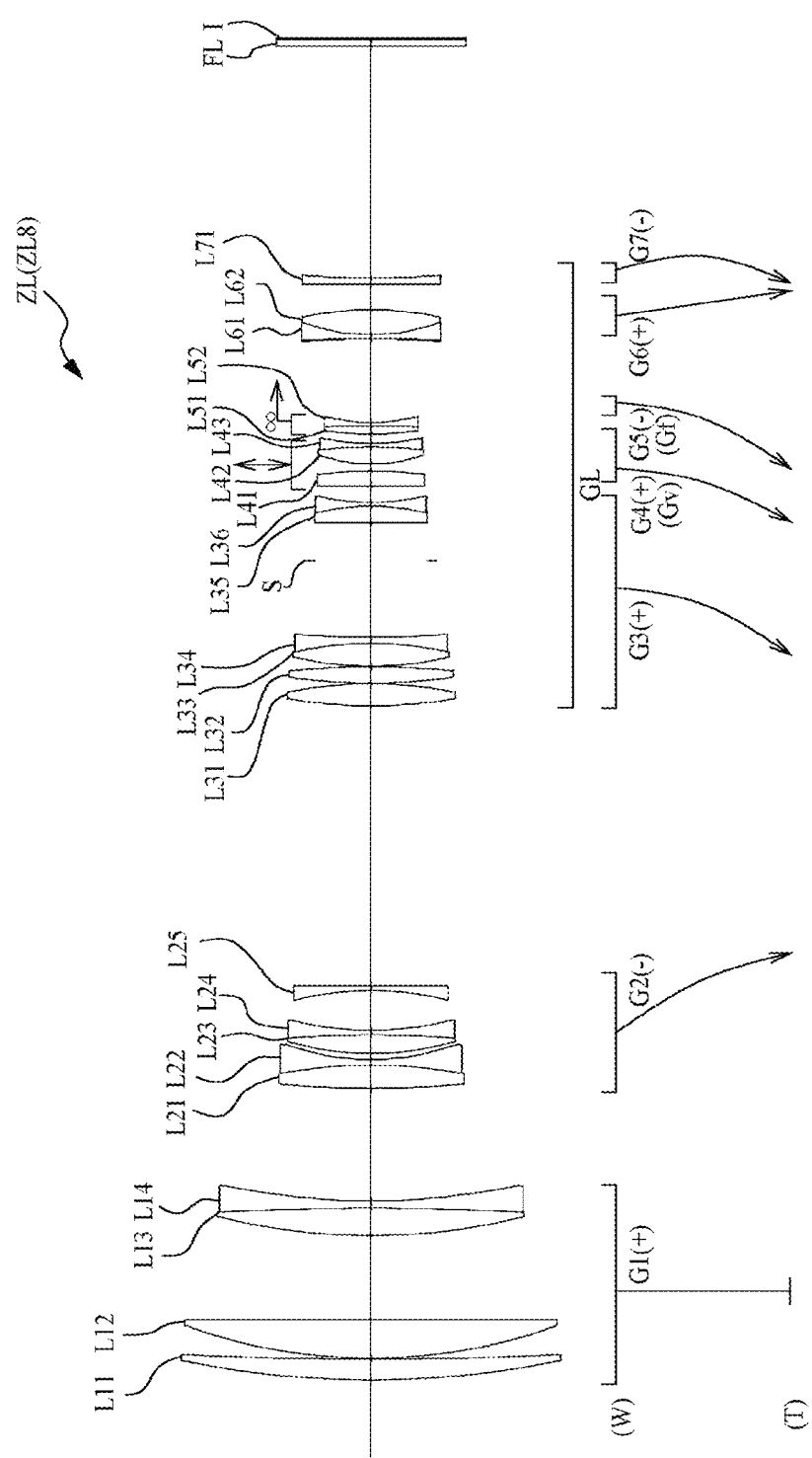

[FIG.16(a)]
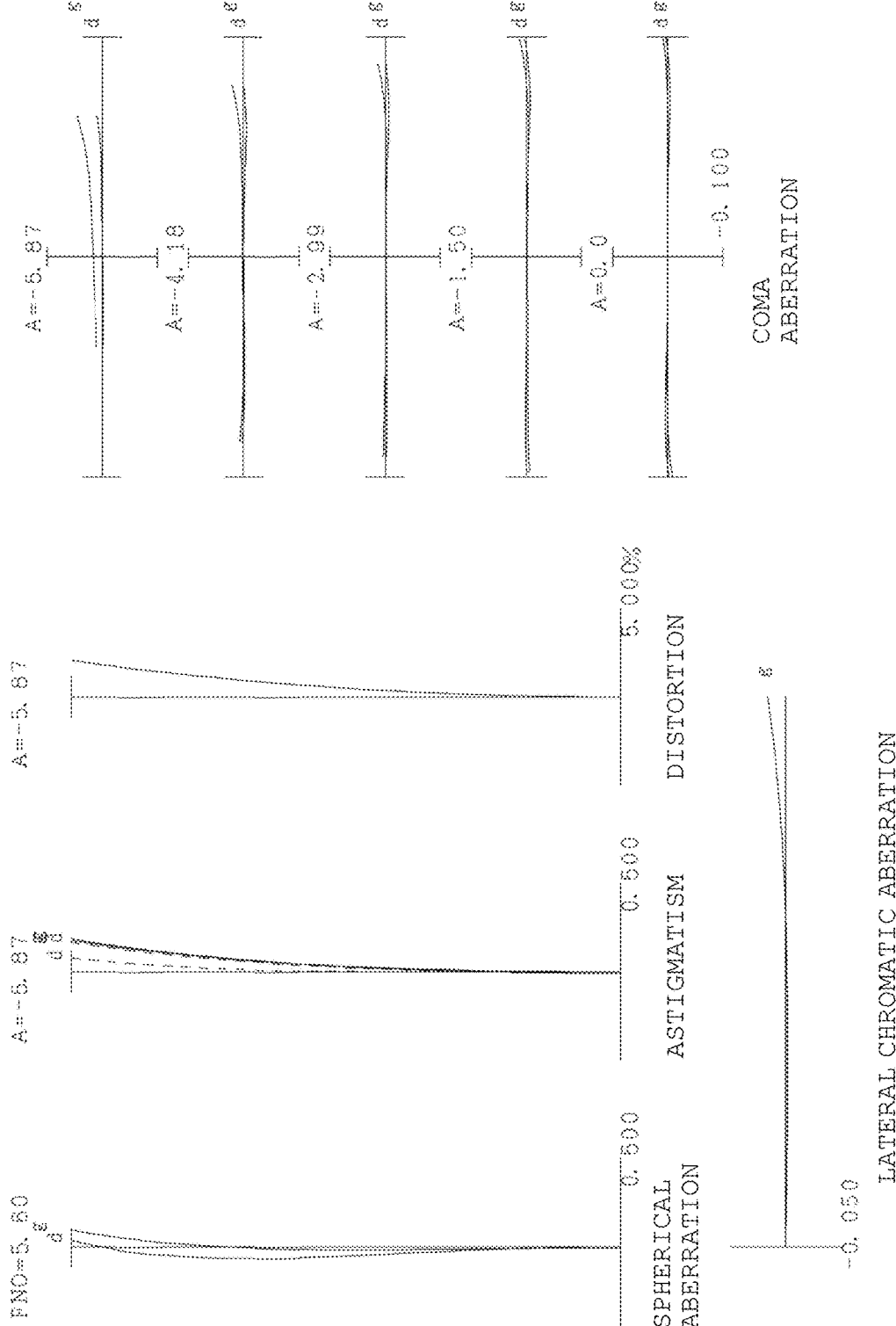

[FIG.16(b)]
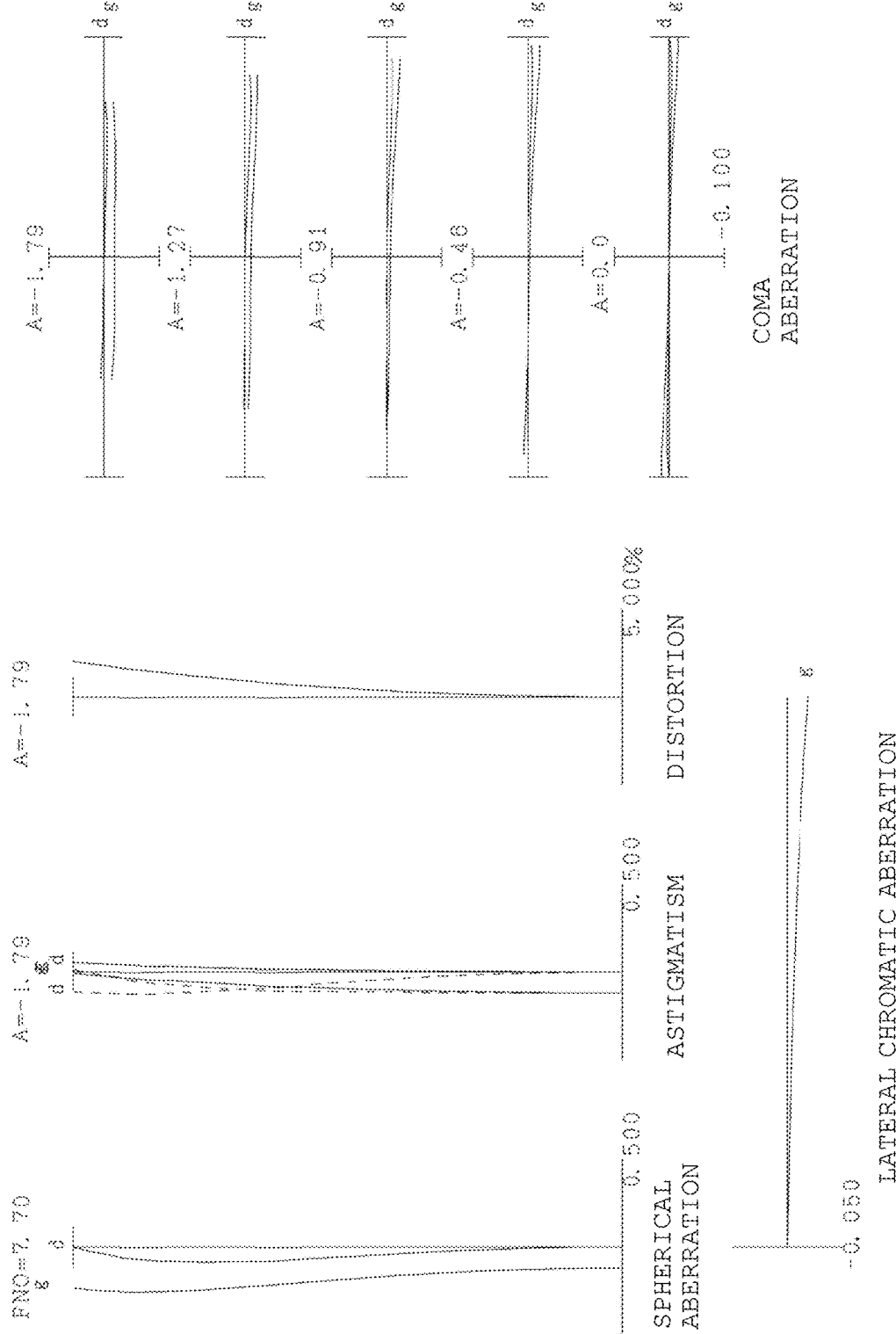

[FIG.17]
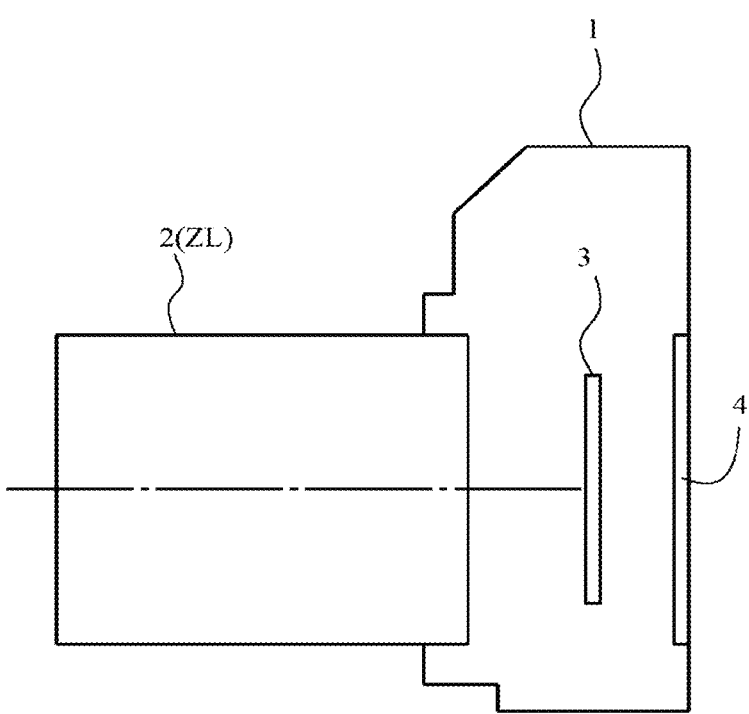

[FIG.18]
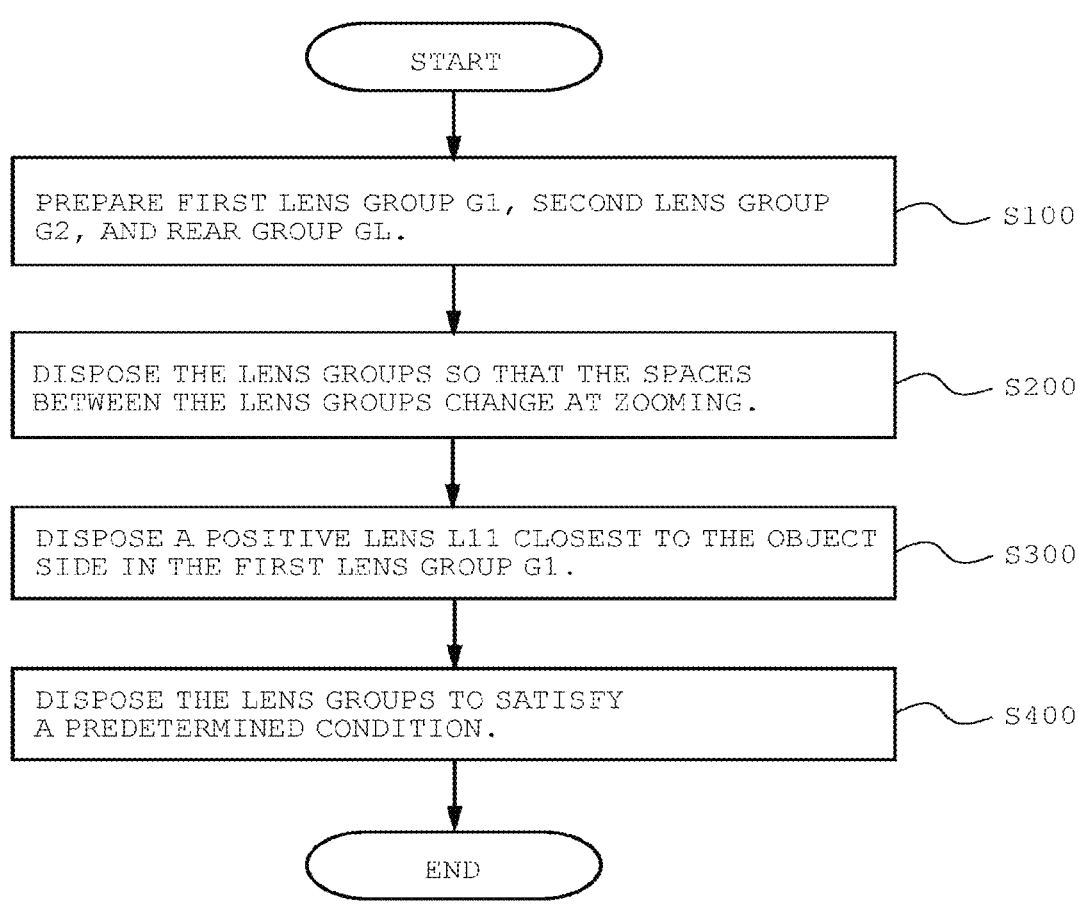

1

ZOOM OPTICAL SYSTEM, OPTICAL APPARATUS, AND METHOD FOR MANUFACTURING ZOOM OPTICAL SYSTEM

TECHNICAL FIELD

The present invention relates to a zoom optical system, an optical apparatus, and a method for manufacturing the zoom optical system.

BACKGROUND ART

Recently, size and weight reduction of a lens barrel in a telephoto zoom optical system has been desired (refer to Patent Literature 1). However, further improvement of optical performance is required for an optical system disclosed in Patent Literature 1.

CITATION LIST

Patent Literature

Patent Literature 1: Japanese Patent Laid-open No. 2016-080824

SUMMARY OF INVENTION

A zoom optical system according to a first aspect of the present invention includes a first lens group having positive refractive power and disposed closest to an object side, a second lens group, and a rear lens group, spaces between the lens groups change at zooming, the first lens group includes a positive lens closest to the object side, and the zoom optical system satisfies a condition expressed by an expression below, $$0.30 < D1MAX/G1d < 0.70$$

in the expression,
D1MAX: maximum air space on an optical axis in the first lens group, and
G1d: thickness of the first lens group on the optical axis.

A zoom optical system according to a second aspect of the present invention includes a first lens group having positive refractive power and disposed closest to an object side, a second lens group, and a rear lens group, spaces between the lens groups change at zooming, the first lens group includes a positive lens closest to the object side, and the zoom optical system satisfies a condition expressed by an expression below, $$0.064 < D1MAX/f1 < 0.140$$

in the expression,
D1MAX: maximum air space on an optical axis in the first lens group, and
f1: focal length of the first lens group.

A method for manufacturing the zoom optical system according to the first aspect of the present invention is a method for manufacturing a zoom optical system including a first lens group having positive refractive power and disposed closest to an object side, a second lens group, and a rear lens group, and the method includes disposing the lens groups so that spaces between the lens groups change at zooming, disposing a positive lens closest to the object side in the first lens group, and disposing the lens groups so that a condition expressed by an expression below is satisfied, $$0.30 < D1MAX/G1d < 0.70$$

in the expression,
D1MAX: maximum air space in the first lens group on an optical axis, and
G1d: thickness of the first lens group on the optical axis.

BRIEF DESCRIPTION OF DRAWINGS

FIG. 1 is a cross-sectional view showing a lens configuration of a zoom optical system according to a first example when focusing on an infinite distance object in a wide-angle end state.

FIG. 2 shows a variety of aberration diagrams of the zoom optical system according to the first example when focusing on an infinite distance object; (a) shows the wide-angle end state and (b) shows a telephoto end state.

FIG. 3 is a cross-sectional view showing a lens configuration of a zoom optical system according to a second example when focusing on an infinite distance object in a wide-angle end state.

FIG. 4 shows a variety of aberration diagrams of the zoom optical system according to the second example when focusing on an infinite distance object; (a) shows the wide-angle end state and (b) shows a telephoto end state.

FIG. 5 is a cross-sectional view showing a lens configuration of a zoom optical system according to a third example when focusing on an infinite distance object in a wide-angle end state.

FIG. 6 shows a variety of aberration diagrams of the zoom optical system according to the third example when focusing on an infinite distance object; (a) shows the wide-angle end state and (b) shows a telephoto end state.

FIG. 7 is a cross-sectional view showing a lens configuration of a zoom optical system according to a fourth example when focusing on an infinite distance object in a wide-angle end state.

FIG. 8 shows a variety of aberration diagrams of the zoom optical system according to the fourth example when focusing on an infinite distance object; (a) shows the wide-angle end state and (b) shows a telephoto end state.

FIG. 9 is a cross-sectional view showing a lens configuration of a zoom optical system according to a fifth example when focusing on an infinite distance object in a wide-angle end state.

FIG. 10 shows a variety of aberration diagrams of the zoom optical system according to the fifth example when focusing on an infinite distance object; (a) shows the wide-angle end state and (b) shows a telephoto end state.

FIG. 11 is a cross-sectional view showing a lens configuration of a zoom optical system according to a sixth example when focusing on an infinite distance object in a wide-angle end state.

FIG. 12 shows a variety of aberration diagrams of the zoom optical system according to the sixth example when focusing on an infinite distance object; (a) shows the wide-angle end state and (b) shows a telephoto end state.

FIG. 13 is a cross-sectional view showing a lens configuration of a zoom optical system according to a seventh example when focusing on an infinite distance object in a wide-angle end state.

FIG. 14 shows a variety of aberration diagrams of the zoom optical system according to the seventh example when focusing on an infinite distance object; (a) shows the wide-angle end state and (b) shows a telephoto end state.

FIG. 15 is a cross-sectional view showing a lens configuration of a zoom optical system according to an eighth example when focusing on an infinite distance object in a wide-angle end state.

FIG. 16 shows a variety of aberration diagrams of the zoom optical system according to the eighth example when focusing on an infinite distance object; (a) shows the wide-angle end state and (b) shows a telephoto end state.

FIG. 17 is a cross-sectional view of a camera on which an above-described zoom optical system is mounted.

FIG. 18 is a flowchart for description of a method for manufacturing the above-described zoom optical system.

DESCRIPTION OF EMBODIMENTS

Preferable embodiments will be described below with reference to the drawings.

First Embodiment

As shown in FIG. 1, a zoom optical system ZL according to a first embodiment includes a first lens group G1 having positive refractive power and disposed closest to an object side, a second lens group G2, and a rear lens group GL, and the spaces between the lens groups change at zooming. In the zoom optical system ZL, the first lens group G1 includes a positive lens (for example, a biconvex positive lens L11 in an example shown in FIG. 1) closest to the object side. With this configuration, it is possible to reduce the size and weight of the zoom optical system ZL while ensuring the optical performance.

Moreover, the zoom optical system ZL according to the first embodiment preferably satisfies Conditional Expression (1) shown below.

$$0.30 < D1MAX/G1d < 0.70 \tag{1}$$

in the expression,

D1MAX: maximum air space on an optical axis in the first lens group G1, and

G1d: thickness of the first lens group G1 on the optical axis.

Conditional Expression (1) defines the ratio of the maximum air space in the first lens group G1 and the thickness of the first lens group G1 on the optical axis. When the upper limit value of Conditional Expression (1) is exceeded, the thickness of the first lens group G1 on the optical axis is too large, which makes it difficult to correct spherical aberration, axial chromatic aberration, lateral chromatic aberration, and the like, and thus such a configuration is not preferable. Meanwhile, it is possible to secure the advantageous effect of the present embodiment by setting the upper limit value of Conditional Expression (1) to 0.68. Further, in order to secure the advantageous effect of the present embodiment further more securely, it is preferable to set the upper limit value of Conditional Expression (1) to 0.65, 0.63, 0.60, 0.58, and more preferable to 0.55. Moreover, when the lower limit value of Conditional Expression (1) is exceeded, which is disadvantageous for size and weight reduction, it is difficult to correct spherical aberration, coma aberration, field curvature, and the like while achieving size and weight reduction, and thus such a configuration is not preferable. Meanwhile, it is possible to secure the advantageous effect of the present embodiment by setting the lower limit value of Conditional Expression (1) to 0.33. Further, in order to secure the advantageous effect of the present embodiment further more securely, it is preferable to set the lower limit value of Conditional Expression (1) to 0.35.

Moreover, the zoom optical system ZL according to the first embodiment preferably satisfies Conditional Expression (2) shown below.

$$0.064 < D1MAX/f1 < 0.140 \tag{2}$$

in the expression,

D1MAX: maximum air space on the optical axis in the first lens group G1, and f1: focal length of the first lens group G1.

Conditional Expression (2) defines the ratio of the maximum air space in the first lens group G1 and the focal length of the first lens group G1. When the upper limit value of Conditional Expression (2) is exceeded, the thickness of the first lens group G1 on the optical axis is too large, which makes it difficult to correct spherical aberration, axial chromatic aberration, lateral chromatic aberration, and the like, and thus such a configuration is not preferable. Meanwhile, it is possible to secure the advantageous effect of the present embodiment by setting the upper limit value of Conditional Expression (2) to 0.138. Further, in order to secure the advantageous effect of the present embodiment further more securely, it is preferable to set the upper limit value of Conditional Expression (2) to 0.135, 0.133, and more preferable to 0.130. Moreover, when the lower limit value of Conditional Expression (2) is exceeded, which is disadvantageous for size and weight reduction, it is difficult to correct spherical aberration, coma aberration, field curvature, and the like while achieving size and weight reduction, and thus such a configuration is not preferable. Meanwhile, it is possible to secure the advantageous effect of the present embodiment by setting the lower limit value of Conditional Expression (2) to 0.065. Further, in order to secure the advantageous effect of the present embodiment further more securely, it is preferable to set the lower limit value of Conditional Expression (2) to 0.068 and more preferable to 0.070.

Second Embodiment

As shown in FIG. 1, the zoom optical system ZL according to a second embodiment includes a first lens group G1 having positive refractive power and disposed closest to the object side, a second lens group G2, and a rear lens group GL, and the spaces between the lens groups change at zooming. In the zoom optical system ZL, the first lens group G1 includes a positive lens (for example, a biconvex positive lens L11 in the example shown in FIG. 1) closest to the object side. With this configuration, it is possible to reduce the size and weight of the zoom optical system ZL.

Moreover, the zoom optical system ZL according to the second embodiment preferably satisfies Conditional Expression (2) shown below.

$$0.064 < D1MAX/f1 < 0.140 \tag{2}$$

in the expression,

D1MAX: maximum air space on the optical axis in the first lens group G1, and f1: focal length of the first lens group G1.

Conditional Expression (2) defines the ratio of the maximum air space in the first lens group G1 and the focal length of the first lens group G1. When the upper limit value of Conditional Expression (2) is exceeded, the thickness of the first lens group G1 on the optical axis is too large, which makes it difficult to correct spherical aberration, axial chromatic aberration, lateral chromatic aberration, and the like, and thus such a configuration is not preferable. Meanwhile, it is possible to secure the advantageous effect of the present embodiment by setting the upper limit value of Conditional Expression (2) to 0.138. Further, in order to secure the advantageous effect of the present embodiment further more securely, it is preferable to set the upper limit value of Conditional Expression (2) to 0.135, 0.133, and more preferable to 0.130. Moreover, when the lower limit value of Conditional Expression (2) is exceeded, which is disadvantageous for size and weight reduction, it is difficult to correct spherical aberration, coma aberration, field curvature, and the like while achieving size and weight reduction, and thus such a configuration is not preferable. Meanwhile, it is possible to secure the advantageous effect of the present embodiment by setting the lower limit value of Conditional Expression (2) to 0.065. Further, in order to secure the advantageous effect of the present embodiment further more securely, it is preferable to set the lower limit value of Conditional Expression (2) to 0.068 and more preferable to 0.070.

First and Second Embodiments

The zoom optical system ZL according to the first and second embodiment (hereinafter referred to as "the present embodiment") preferably satisfies Conditional Expression (3) shown below.

$$0.20 < f1/ft < 0.50 \qquad (3)$$

in the expression, f1: focal length of the first lens group G1, and ft: overall focal length of the zoom optical system ZL in a telephoto end state.

Conditional Expression (3) defines the ratio of the focal length of the first lens group G1 and the overall focal length in the telephoto end state. When the range of Conditional Expression (3) is satisfied, it is possible to favorably correct variation of a variety of aberrations such as spherical aberration, field curvature, and coma aberration at zooming. When the range of Conditional Expression (3) is not satisfied, variation of aberrations such as spherical aberration, field curvature, and coma aberration at zooming is large, which is not preferable. Meanwhile, it is possible to secure the advantageous effect of the present embodiment by setting the upper limit value of Conditional Expression (3) to 0.48. Further, in order to secure the advantageous effect of the present embodiment further more securely, it is preferable to set the upper limit value of Conditional Expression (3) to 0.46, 0.45, and more preferable to 0.44. Moreover, it is possible to secure the advantageous effect of the present embodiment by setting the lower limit value of Conditional Expression (3) to 0.23. Further, in order to secure the advantageous effect of the present embodiment further more securely, it is preferable to set the lower limit value of Conditional Expression (3) to 0.25, 0.28, and more preferable to 0.30.

Moreover, in the zoom optical system ZL according to the present embodiment, the rear lens group GL preferably includes an aperture (for example, an aperture stop S shown in FIG. 1), and at least part of an image plane side of the aperture is preferably an anti-vibration group Gv configured to move with a component in a direction perpendicular to the optical axis.

Moreover, the zoom optical system ZL according to the present embodiment preferably satisfies Conditional Expression (4) shown below.

$$1.50 < (1-\beta tv) \times \beta tvb < 3.00 \qquad (4)$$

in the expression, $\beta tv$: lateral magnification of the anti-vibration group Gv in the telephoto end state, and $\beta tvb$: lateral magnification of groups on the image plane side of the anti-vibration group Gv in the telephoto end state.

Conditional Expression (4) defines a condition that anti-vibration is performed by the anti-vibration group Gv. When Conditional Expression (4) is satisfied, it is possible to favorably correct variation of a variety of aberrations such as coma aberration, field curvature, and astigmatism at anti-vibration. When the range of Conditional Expression (4) is not satisfied, it is difficult to perform, in a balanced manner, correction of a variety of aberrations in normal operation and correction of coma aberration, field curvature, astigmatism, and the like at anti-vibration, and thus such a configuration is not preferable. Meanwhile, it is possible to secure the advantageous effect of the present embodiment by setting the upper limit value of Conditional Expression (4) to 2.90. Further, in order to secure the advantageous effect of the present embodiment further more securely, it is preferable to set the upper limit value of Conditional Expression (4) to 2.80, 2.70, 2.60, and more preferable to 2.50. Moreover, it is possible to secure the advantageous effect of the present embodiment by setting the lower limit value of Conditional Expression (4) to 1.60. Further, in order to secure the advantageous effect of the present embodiment further more securely, it is preferable to set the lower limit value of Conditional Expression (4) to 1.70, 1.80, 1.90, 2.00, 2.10, and more preferable to 2.20.

Moreover, in the zoom optical system ZL according to the present embodiment, the anti-vibration group Gv preferably includes, sequentially from the object side, a positive lens, a positive lens, and a negative lens. With this configuration, it is possible to correct variation of a variety of aberrations such as coma aberration at anti-vibration.

Moreover, the zoom optical system ZL according to the present embodiment preferably satisfies Conditional Expression (5) shown below.

$$0.020 < Gvd/TLt < 0.040 \qquad (5)$$

in the expression,

Gvd: thickness of the anti-vibration group Gv on the optical axis, and

TLt: optical total length of the zoom optical system ZL in the telephoto end state.

Conditional Expression (5) defines the ratio of the thickness of the anti-vibration group on the optical axis and the optical total length of the zoom optical system ZL in the telephoto end state. When Conditional Expression (5) is satisfied, it is possible to favorably correct variation of a variety of aberrations such as coma aberration and astigmatism at anti-vibration. When the range of Conditional Expression (5) is not satisfied, it is difficult to correct a variety of aberrations such as coma aberration and astigmatism at anti-vibration while achieving size and weight reduction, and thus such a configuration is not preferable. Meanwhile, it is possible to secure the advantageous effect of the present embodiment by setting the upper limit value of Conditional Expression (5) to 0.038. Further, in order to secure the advantageous effect of the present embodiment further more securely, it is preferable to set the upper limit value of Conditional Expression (5) to 0.036 and more preferable to 0.035. Moreover, it is possible to secure the advantageous effect of the present embodiment by setting the lower limit value of Conditional Expression (5) to 0.022. Further, in order to secure the advantageous effect of the present embodiment further more securely, it is preferable to set the lower limit value of Conditional Expression (5) to 0.024, 0.025, and more preferable to 0.027.

Moreover, in the zoom optical system ZL according to the present embodiment, the rear lens group GL preferably includes an aperture, and at least part of the image plane side of the aperture is preferably a focusing group Gf configured to move in the optical axis direction at focusing.

Moreover, the zoom optical system ZL according to the present embodiment preferably satisfies Conditional Expression (6) shown below.

$$-8.00 < (1 - \beta tf^2) \times \beta tfb^2 < -4.00 \tag{6}$$

in the expression, $\beta tf$: lateral magnification of the focusing group Gf in the telephoto end state, and $\beta tfb$: lateral magnification of groups on the image plane side of the focusing group Gf in the telephoto end state.

Conditional Expression (6) defines a condition that focusing is performed by the focusing group Gf. When Conditional Expression (6) is satisfied, it is possible to favorably correct variation of a variety of aberrations such as spherical aberration, coma aberration, field curvature, and astigmatism at focusing. When the range of Conditional Expression (6) is not satisfied, it is difficult to perform, in a balanced manner, correction of a variety of aberrations in normal operation and correction of spherical aberration, coma aberration, field curvature, astigmatism, and the like at focusing, and thus such a configuration is not preferable. Meanwhile, it is possible to secure the advantageous effect of the present embodiment by setting the upper limit value of Conditional Expression (6) to −4.25. Further, in order to secure the advantageous effect of the present embodiment further more securely, it is preferable to set the upper limit value of Conditional Expression (6) to −4.50, −4.75, and more preferable to −5.00. Moreover, it is possible to secure the advantageous effect of the present embodiment by setting the lower limit value of Conditional Expression (6) to −7.50. Further, in order to secure the advantageous effect of the present embodiment further more securely, it is preferable to set the lower limit value of Conditional Expression (6) to −7.00, −6.50, −6.00, −5.80, and more preferable to −5.50.

Moreover, in the zoom optical system ZL according to the present embodiment, the focusing group Gf preferably includes, sequentially from the object side, a positive lens and a negative lens. With this configuration, it is possible to correct variation of axial chromatic aberration and lateral chromatic aberration at focusing.

Moreover, the zoom optical system ZL according to the present embodiment preferably satisfies Conditional Expression (7) shown below.

$$0.005 < Gfd/TLt < 0.015 \tag{7}$$

in the expression,

Gfd: thickness of the focusing group Gf on the optical axis, and

TLt: optical total length of the zoom optical system ZL in the telephoto end state.

Conditional Expression (7) defines the ratio of the thickness of the focusing group Gf on the optical axis and the optical total length of the zoom optical system ZL in the telephoto end state. When Conditional Expression (7) is satisfied, it is possible to favorably correct variation of a variety of aberrations such as coma aberration and astigmatism at focusing. When the range of Conditional Expression (7) is not satisfied, it is difficult to correct a variety of aberrations such as coma aberration and astigmatism at focusing while achieving size and weight reduction, and thus such a configuration is not preferable. Meanwhile, it is possible to secure the advantageous effect of the present embodiment by setting the upper limit value of Conditional Expression (7) to 0.014. Further, in order to secure the advantageous effect of the present embodiment further more securely, it is preferable to set the upper limit value of Conditional Expression (7) to 0.013 and more preferable to 0.012. Moreover, it is possible to secure the advantageous effect of the present embodiment by setting the lower limit value of Conditional Expression (7) to 0.006. Further, in order to secure the advantageous effect of the present embodiment further more securely, it is preferable to set the lower limit value of Conditional Expression (7) to 0.007 and more preferable to 0.008.

Moreover, in the zoom optical system ZL according to the present embodiment, the first lens group G1 preferably includes a negative lens closest to the image plane side. As described above, it is possible to reduce the size and weight of the zoom optical system ZL by disposing a positive lens closest to the object side in the first lens group G1 and additionally disposing a negative lens closest to the image plane side.

Moreover, the zoom optical system ZL according to the present embodiment preferably satisfies Conditional Expression (8) shown below.

$$0.04 < G1d/ft < 0.15 \tag{8}$$

in the expression,

G1d: thickness of the first lens group G1 on the optical axis, and ft: overall focal length of the zoom optical system ZL in the telephoto end state.

Conditional Expression (8) defines the ratio of the thickness of the first lens group G1 on the optical axis and the overall focal length of the zoom optical system ZL in the telephoto end state. When Conditional Expression (8) is satisfied, it is possible to favorably correct a variety of aberrations. When the upper limit value of Conditional Expression (8) is exceeded, the thickness of the first lens group G1 on the optical axis is too large, which makes it difficult to correct a variety of aberrations such as spherical aberration, axial chromatic aberration, and lateral chromatic aberration, and such a configuration is not preferable. Meanwhile, it is possible to secure the advantageous effect of the present embodiment by setting the upper limit value of Conditional Expression (8) to 0.14. Further, in order to secure the advantageous effect of the present embodiment further more securely, it is preferable to set the upper limit value of Conditional Expression (8) to 0.13 and more preferable to 0.12. Moreover, when the lower limit value of Conditional Expression (8) is exceeded, which is disadvantageous for size and weight reduction, it is difficult to correct a variety of aberrations such as spherical aberration, coma aberration, and field curvature while achieving size and weight reduction, and thus such a configuration is not preferable. Meanwhile, it is possible to secure the advantageous effect of the present embodiment by setting the lower limit value of Conditional Expression (8) to 0.05. Further, in order to secure the advantageous effect of the present embodiment further more securely, it is preferable to set the lower limit value of Conditional Expression (8) to 0.055.

Moreover, in the zoom optical system ZL according to the present embodiment, the rear lens group GL preferably includes a lens group (for example, a third lens group G3 in FIG. 1) including an aperture, and Conditional Expression (9) shown below is preferably satisfied.

$$0.05 < Gsd/TLt < 0.30 \tag{9}$$

in the expression,

Gsd: thickness of the lens group including the aperture on the optical axis, and TLt: optical total length of the zoom optical system ZL in the telephoto end state.

Conditional Expression (9) defines the ratio of the thickness of the lens group including the aperture on the optical axis and the optical total length of the zoom optical system ZL in the telephoto end state. When Conditional Expression (9) is satisfied, it is possible to favorably correct a variety of aberrations such as spherical aberration, field curvature, and astigmatism. When the range of Conditional Expression (9) is not satisfied, it is difficult to correct a variety of aberrations such as spherical aberration, field curvature, and astigmatism while achieving size and weight reduction, and thus such a configuration is not preferable. Meanwhile, it is possible to secure the advantageous effect of the present embodiment by setting the upper limit value of Conditional Expression (9) to 0.28. Further, in order to secure the advantageous effect of the present embodiment further more securely, it is preferable to set the upper limit value of Conditional Expression (9) to 0.25, 0.23, and more preferable to 0.20. Moreover, it is possible to secure the advantageous effect of the present embodiment by setting the lower limit value of Conditional Expression (9) to 0.06. Further, in order to secure the advantageous effect of the present embodiment further more securely, it is preferable to set the lower limit value of Conditional Expression (9) to 0.08, 0.10, 0.12, and more preferable to 0.13.

Moreover, in the zoom optical system ZL according to the present embodiment, the first lens group G1 preferably includes a negative lens disposed closest to the image plane side, and a positive lens adjacently disposed on the object side of the negative lens. As described above, it is possible to reduce the size and weight of the zoom optical system ZL by disposing a positive lens closest to the object side in the first lens group G1, and additionally disposing a negative lens closest to the image plane side and adjacently disposing a positive lens on the object side of the negative lens.

Moreover, the zoom optical system ZL according to the present embodiment preferably satisfies Conditional Expression (10) shown below.

$$0.015 < D1MAX/ft < 0.080 \tag{10}$$

in the expression,

D1MAX: maximum air space on the optical axis in the first lens group G1, and ft: overall focal length of the zoom optical system ZL in the telephoto end state.

Conditional Expression (10) defines the ratio of the maximum air space on the optical axis in the first lens group G1 and the overall focal length of the zoom optical system ZL in the telephoto end state. When Conditional Expression (10) is satisfied, it is possible to favorably correct a variety of aberrations. When the upper limit value of Conditional Expression (10) is exceeded, it is difficult to correct a variety of aberrations such as spherical aberration, axial chromatic aberration, and lateral chromatic aberration, and thus such a configuration is not preferable. Meanwhile, it is possible to secure the advantageous effect of the present embodiment by setting the upper limit value of Conditional Expression (10) to 0.075. Further, in order to secure the advantageous effect of the present embodiment further more securely, it is preferable to set the upper limit value of Conditional Expression (10) to 0.070, 0.065, 0.060, 0.058, and more preferable to 0.055. Moreover, when the lower limit value of Conditional Expression (10) is exceeded, which is disadvantageous for size and weight reduction, it is difficult to correct a variety of aberrations such as spherical aberration, coma aberration, and field curvature while achieving size and weight reduction, and thus such a configuration is not preferable. Meanwhile, it is possible to secure the advantageous effect of the present embodiment by setting the lower limit value of Conditional Expression (10) to 0.016. Further, in order to secure the advantageous effect of the present embodiment further more securely, it is preferable to set the lower limit value of Conditional Expression (10) to 0.018 and more preferable to 0.020.

Moreover, the zoom optical system ZL according to the present embodiment preferably satisfies Conditional Expression (11) shown below.

$$0.15 < Bfw/fw < 0.50 \tag{11}$$

in the expression,

Bfw: back focus of the zoom optical system ZL in a wide-angle end state, and fw: overall focal length of the zoom optical system ZL in the wide-angle end state.

Conditional Expression (11) defines the ratio of the back focus and overall focal length of the zoom optical system ZL in the wide-angle end state. Meanwhile, it is possible to secure the advantageous effect of the present embodiment by setting the upper limit value of Conditional Expression (11) to 0.48. Further, in order to secure the advantageous effect of the present embodiment further more securely, it is preferable to set the upper limit value of Conditional Expression (11) to 0.45, 0.43, and more preferable to 0.40. Moreover, it is possible to secure the advantageous effect of the present embodiment by setting the lower limit value of Conditional Expression (11) to 0.18. Further, in order to secure the advantageous effect of the present embodiment further more securely, it is preferable to set the lower limit value of Conditional Expression (11) to 0.20, 0.23, 0.25, and more preferable to 0.28.

Moreover, the zoom optical system ZL according to the present embodiment preferably satisfies Conditional Expression (12) shown below.

$$4.00° < \omega w < 10.00° \tag{12}$$

in the expression,

ωw: half angle of view of the zoom optical system ZL in the wide-angle end state.

Conditional Expression (12) defines the range of the half angle of view of the zoom optical system ZL in the wide-angle end state. Meanwhile, it is possible to secure the advantageous effect of the present embodiment by setting the upper limit value of Conditional Expression (12) to 9.50°. Further, in order to secure the advantageous effect of the present embodiment further more securely, it is preferable to set the upper limit value of Conditional Expression (12) to 9.00°, 8.80°, 8.50°, 8.30°, and more preferable to 8.00°. Moreover, it is possible to secure the advantageous effect of the present embodiment by setting the lower limit value of Conditional Expression (12) to 4.30°. Further, in order to secure the advantageous effect of the present embodiment further more securely, it is preferable to set the lower limit value of Conditional Expression (12) to 4.50°, 4.80°, 5.00°, 5.30°, and more preferable to 5.50°.

In the zoom optical system ZL according to the present embodiment, the rear lens group GL preferably includes, sequentially from the object side, a positive lens group, a positive lens group, and a negative lens group. Moreover, at least part of at least one of the positive lens group, the positive lens group, and the negative lens group included in the rear lens group GL is preferably the anti-vibration group Gv configured to move with a component in the direction perpendicular to the optical axis, and at least part of at least one of the positive lens group, the positive lens group, and the negative lens group is preferably the focusing group Gf configured to move in the optical axis direction at focusing. With this configuration, it is possible to prevent aberration variation at anti-vibration and focusing while achieving size and weight reduction of the zoom optical system ZL.

Moreover, in the zoom optical system ZL according to the present embodiment, the rear lens group GL preferably includes the anti-vibration group Gv configured to move with a component in the direction perpendicular to the optical axis, and the anti-vibration group Gv is preferably a positive lens group.

Moreover, in the zoom optical system ZL according to the present embodiment, the rear lens group GL preferably includes the focusing group Gf configured to move in the optical axis direction at focusing, and the focusing group Gf is preferably a negative lens group.

Moreover, in the zoom optical system ZL according to the present embodiment, a lens group disposed closest to the image plane side in the rear lens group GL preferably has positive refractive power.

Moreover, in the zoom optical system ZL according to the present embodiment, the first lens group G1 is preferably fixed relative to the image plane at zooming. With this configuration, it is possible to reduce the number of components used for a mechanism configured to move lens groups at zooming, and it is possible to reduce the size and weight of the zoom optical system ZL. Moreover, it is possible to prevent variance of the optical performance at zooming. Such a configuration is advantageous for reducing variance of the optical performance at manufacturing.

Note that conditions and configurations described above each achieve an above-described effect, and not all configurations and conditions necessarily need to be satisfied but the above-described effect can be obtained with either conditions or configurations or with either combination of conditions or configurations.

Subsequently, a camera that is an optical apparatus including the zoom optical system ZL according to the present embodiment will be described below with reference to FIG. 17. This camera 1 is what is called a mirrorless interchangeable lens camera including the zoom optical system ZL according to the present embodiment as an image pickup lens 2. In the camera 1, light from a non-shown object (subject) is condensed through the image pickup lens 2 and forms a subject image on the image surface of an image unit 3 through a non-shown optical low pass filter (OLPF). Then, the subject image is photoelectrically converted by a photoelectric conversion element provided in the image unit 3 and an image of the subject is generated. The image is displayed on an electronic view finder (EVF) 4 provided in the camera 1. Accordingly, a photographer can observe the subject through the EVF 4.

When a non-shown release button is pressed by the photographer, the image photoelectrically converted by the image unit 3 is stored in a non-shown memory. In this manner, the photographer can perform image capturing of the subject with the camera 1. Meanwhile, although the example of a mirrorless camera is described in the present embodiment, it is possible to achieve the same effects as those of the camera 1 described above when the zoom optical system ZL according to the present embodiment is mounted on a single-lens reflex camera that includes a quick return mirror in a camera body and with which a subject is observed through a finder optical system.

The contents described below are employable as appropriate to the extent that the optical performance is not compromised.

In the present embodiment, the zoom optical system ZL having a six-group configuration or a seven-group configuration is shown as described later, and such configurations, conditions, and the like are also applicable to any other group configuration such as an eight-group configuration or a nine-group configuration. Further, the zoom optical system ZL may instead have a configuration in which a lens or a lens group closest to the object side is added or a configuration in which a lens or a lens group closest to the image plane side is added. Specifically, such a configuration is a configuration in which a lens group having a position fixed relative to the image plane at zooming or at focusing is added closest to the image plane side. A lens group (simply referred to as a "group") means a part including at least one lens and separated by an air space that changes at zooming or at focusing. A lens component means a single lens or a cemented lens obtained by cementing a plurality of lenses.

A focusing group may be a single lens group, a plurality of lens groups, or a partial lens group moved in the optical axis direction to focus on from an infinite distance object to a close distance object. In this case, the focusing group can also be used to perform autofocusing and is suitably driven by a motor for autofocusing (such as an ultrasonic wave motor). In particular, the focusing group is preferably at least part of a fifth lens group G5 (in a seventh example, a sixth lens group G6). Further, any lens other than the focusing group preferably has a position fixed relative to the image plane at focusing. When a load on a motor is considered, the focusing group is preferably constituted by a single lens or one lens component.

An anti-vibration group may be a lens group or a partial lens group so moved with a displacement component in the direction perpendicular to the optical axis or rotated (swung) in an in-plane direction containing the optical axis to correct an image blur caused by a camera shake. In particular, the anti-vibration group is preferably at least part of a fourth lens group G4 (in the seventh example, the fifth lens group G5).

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or the lenses may be any of a distributed index lens (GRIN lens) or a plastic lens.

The aperture stop S is preferably disposed in the third lens group G3 (in the seventh example, in the fourth lens group G4) in the rear lens group GL. No member as an aperture stop may be provided, and the frame of a lens may serve as the aperture stop.

Further, each lens surface may be provided with an antireflection coating having high transmittance over a wide wavelength range to achieve good optical performance that reduces flare and ghost and achieves high contrast.

A method for manufacturing the zoom optical system ZL according to the present embodiment will be schematically described below with reference to FIG. 18. First, the first lens group G1 having positive refractive power, the second lens group G2, and the rear lens group GL are prepared (step S100). Subsequently, the lens groups are disposed so that the spaces between the lens groups change at zooming (step S200), and further, a positive lens L11 is disposed closest to the object side in the first lens group G1 (step S300). Then, the lens groups are disposed to satisfy a predetermined condition (for example, Conditional Expression (1) described above) (step S400).

With the above-described configurations, it is possible to provide a zoom optical system that can achieve size and weight reduction and has the high optical performance, an optical apparatus, and a method for manufacturing the zoom optical system.

EXAMPLES

Examples will be described below with reference to the drawings. Note that FIGS. 1, 3, 5, 7, 9, 11, 13, and 15 are cross-sectional views showing the configurations of zoom optical systems ZL (ZL1 to ZL8) according to the examples and the refractive power distribution thereof. The lower part of each drawing shows the movement locus of each lens group in the corresponding zoom optical system ZL from the wide-angle end state (W) to the telephoto end state (T) at zooming.

In the examples, each aspheric surface is expressed by Expression (a) below, where y represents the height in a direction orthogonal to the optical axis, S(y) represents the distance (sag amount) on the optical axis from a tangent plane at the apex of the aspheric surface at the height y to the aspheric surface, r represents the radius of curvature (paraxial radius of curvature) of a reference spherical surface, K represents the conic constant, and An represents the n-th aspheric surface coefficient. Note that, in the examples below, "E−n" represents "×10$^{-n}$".

$$S(y)=(y^2/r)/\{1+(1-Kxy2/r2)^{1/2}\}+A4xy^4+A6xy^6+A8x$$
$$y^8+A10xy^{10} \tag{a}$$

Note that, in the examples, the second aspheric surface coefficient A2 is zero.

The examples described below show specific examples of the present application invention, and the present application invention is not limited to the examples.

First Example

FIG. 1 is a diagram showing the configuration of a zoom optical system ZL1 according to a first example. The zoom optical system ZL1 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having positive refractive power.

The first lens group G1 includes, sequentially from the object side, a biconvex positive lens L11 and a cemented positive lens formed by cementing a biconvex positive lens L12 and a biconcave negative lens L13. The second lens group G2 includes, sequentially from the object side, a cemented negative lens formed by cementing a biconvex positive lens L21 and a biconcave negative lens L22, a cemented negative lens formed by cementing a biconvex positive lens L23 and a biconcave negative lens L24, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented negative lens formed by cementing a biconvex positive lens L42 and a biconcave negative lens L43. The fifth lens group G5 includes a cemented lens formed by cementing a biconvex positive lens L51 and a biconcave negative lens L52 sequentially from the object side. The sixth lens group G6 includes a cemented positive lens formed by cementing an aspheric negative lens L61 having a biconcave shape with an aspheric surface formed on a lens surface on the object side and a biconvex positive lens L62 sequentially from the object side.

An aperture stop S is disposed between the biconcave negative lens L34 and the positive meniscus lens L35 in the third lens group G3. In addition, a filter group FL is disposed between the rear lens group GL and an image plane I.

In the zoom optical system ZL1, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL1, image position correction (anti-vibration) when a camera shake occurs is performed by moving the fourth lens group G4 as the anti-vibration group Gv with a displacement component in the direction perpendicular to the optical axis.

In the zoom optical system ZL1, focusing on from an infinite distance object to a close distance object is performed by moving the fifth lens group G5 as the focusing group Gf to the image side along the optical axis.

Table 1 below shows values of specifications of the zoom optical system ZL1. In Table 1, the following specifications shown as overall specifications are defined as follows: f represents the overall focal length; Fno represents the F number; co represents the half angle of view (maximum incident angle in the unit of [°]); Y represents the maximum image height; BF represents the back focus at focusing on an infinite distance object; and TL represents values of the optical total length at focusing on an infinite distance object in the wide-angle end state, an intermediate focal length state, and the telephoto end state. The back focus BF represents the distance on the optical axis from the lens surface (thirty-sixth surface) closest to the image plane side to the image plane I. The optical total length TL represents the distance on the optical axis from the lens surface (first surface) closest to the object side to the image plane I. In lens data, a first field m shows the sequence of lens surfaces (surface numbers) counted from the object side in a direction in which a ray travels. A second field r shows the radius of curvature of each lens surface. A third field d shows the distance (inter-surface distance) on the optical axis from each optical surface to the following optical surface. A fourth field nd and a fifth field vd show the refractive index and the Abbe number at the d line (λ=587.6 nm). A radius of curvature of ∞ represents a flat surface, and the refractive index of air, which is 1.000000, is omitted. When a lens surface is an aspheric surface, a symbol * is provided on the right side of the surface number and the field of the radius of curvature r shows the paraxial radius of curvature. The lens group focal length shows the number of the first surface and the focal length of each of the first to sixth lens groups G1 to G6.

The unit of each of the focal length f, the radius of curvature r, the inter-surface distance d, and other lengths shown in all the variety of specifications below is typically "mm", but not limited to this, because an optical system provides the same optical performance even when the optical system is proportionally enlarged or reduced.

The description of the reference characters and the description of the specification tables hold true for those in the following examples.

TABLE 1

First example

[Overall specifications]

|  | Wide-angle end | Intermediate focal length | Telephoto end |
|---|---|---|---|
| f | 185.000 | 305.000 | 581.999 |
| Fno | 5.151 | 5.259 | 6.480 |
| ω | 6.53 | 3.93 | 2.08 |
| Y | 21.630 | 21.630 | 21.630 |
| BF | 56.619 | 58.421 | 54.491 |
| BF(air-conversion length) | 56.074 | 57.876 | 53.946 |
| TL | 330.000 | 329.999 | 330.000 |
| TL(air-conversion length) | 329.455 | 329.454 | 329.455 |

[Lens data]

| m | r | d | nd | vd |
|---|---|---|---|---|
| Object plane | ∞ | | | |
| 1 | 114.53279 | 11.500 | 1.518600 | 69.89 |
| 2 | −3061.17760 | 25.000 | | |
| 3 | 105.69467 | 9.500 | 1.496997 | 81.61 |
| 4 | −577.89907 | 2.000 | 1.795040 | 28.69 |
| 5 | 187.41793 | d1 | | |
| 6 | 231.95439 | 5.100 | 1.892860 | 20.36 |
| 7 | −143.36563 | 1.200 | 1.603000 | 65.44 |
| 8 | 60.53698 | 4.000 | | |
| 9 | 79.45471 | 5.200 | 1.808090 | 22.74 |
| 10 | −278.51621 | 1.200 | 1.903658 | 31.32 |
| 11 | 87.26332 | 12.973 | | |
| 12 | −63.24454 | 1.200 | 1.902000 | 25.26 |
| 13 | 547.46152 | d2 | | |
| 14 | 128.87267 | 5.600 | 1.437001 | 95.10 |
| | −80.05371 | 0.200 | | |
| 16 | 124.19685 | 4.700 | 1.496997 | 81.61 |
| 17 | −127.34752 | 0.200 | | |
| 18 | 76.12573 | 6.000 | 1.487489 | 70.44 |
| 19 | −74.22322 | 1.200 | 1.903658 | 31.32 |
| 20 | 350.93166 | 24.378 | | |
| 21 | ∞ | 10.000 | | Aperture stop S |
| 22 | −240.73230 | 4.400 | 1.854779 | 24.80 |
| 23 | −46.89217 | 1.000 | 1.618000 | 63.34 |
| 24 | 54.46304 | d3 | | |
| 25 | 56.46175 | 4.000 | 1.720467 | 34.71 |
| 26 | −143.84626 | 0.200 | | |

TABLE 1-continued

First example

| 27 | 37.26021 | 4.400 | 1.672700 | 32.19 |
|---|---|---|---|---|
| 28 | −77.53975 | 1.000 | 1.860740 | 23.08 |
| 29 | 38.85225 | d4 | | |
| 30 | 84.46824 | 2.000 | 1.688930 | 31.16 |
| 31 | −117.74138 | 1.000 | 1.834810 | 42.73 |
| 32 | 36.08530 | d5 | | |
| 33* | −484.81263 | 0.100 | 1.560930 | 36.64 |
| 34 | −3406.43640 | 1.000 | 1.816000 | 46.59 |
| 35 | 36.92132 | 7.000 | 1.647690 | 33.72 |
| 36 | −85.19724 | d6 | | |
| 37 | ∞ | 1.600 | 1.516800 | 63.88 |
| Image plane | ∞ | | | |

[Focal length of lens groups]

| Lens group | First surface | Focal length |
|---|---|---|
| First lens group G1 | 1 | 202.200 |
| Second lens group G2 | 6 | −48.201 |
| Third lens group G3 | 14 | 78.109 |
| Fourth lens group G4 | 25 | 71.573 |
| Fifth lens group G5 | 30 | −62.915 |
| Sixth lens group G6 | 33 | 499.711 |

In the zoom optical system ZL1, the thirty-third surface is an aspheric surface. Table 2 below shows aspheric surface data, in other words, the values of the conic constant K and the aspheric surface constants A4 to A10 for the surface number m.

TABLE 2

[Aspheric surface data]

| m | K | A4 | A6 | A8 | A10 |
|---|---|---|---|---|---|
| 33 | 1.00 | 1.75163E−06 | 8.31126E−10 | 1.77225E−12 | −4.35522E−15 |

In the zoom optical system ZL1, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 3 below shows variable spaces in the wide-angle end state, the intermediate focal length state, and the telephoto end state.

TABLE 3

[Variable space data]

| | Wide-angle end | Intermediate focal length | Telephoto end |
|---|---|---|---|
| d1 | 18.150 | 43.488 | 51.449 |
| d2 | 64.299 | 38.961 | 1.000 |
| d3 | 5.237 | 4.200 | 3.822 |
| d4 | 2.500 | 5.233 | 17.594 |
| d5 | 25.944 | 22.446 | 44.393 |
| d6 | 54.519 | 56.322 | 52.391 |

FIG. 2 show a spherical aberration diagram, an astigmatism diagram, a distortion diagram, a lateral chromatic aberration diagram, and a coma aberration diagram of the zoom optical system ZL1 at focusing on an infinite distance object in the wide-angle end state and the telephoto end state. In each aberration diagram, FNO represents the F number, and reference character A represents the half angle of view (in the unit of [°]) relative to the image height. The spherical aberration diagram shows the value of the F number corresponding to the maximum diameter, the astigmatism diagram and the distortion diagram each show the value of the half angle of view, and the coma aberration diagram shows the value of each half angle of view. In the spherical aberration diagram, the lateral chromatic aberration diagram, and the coma aberration diagram, reference character d represents the d-line ($\lambda$=587.6 nm), and reference character g represents the g-line ($\lambda$=435.8 nm). In the astigmatism diagram, the solid line represents the sagittal image plane, and the dashed line represents the meridional image plane. Further, in the aberration diagrams in the following examples, the same reference characters as those in the present example are used. The aberration diagrams show that the zoom optical system ZL1 allows favorable correction of the variety of aberrations and has excellent imaging performance.

Second Example

FIG. 3 is a diagram showing the configuration of a zoom optical system ZL2 according to a second example. The zoom optical system ZL2 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having positive refractive power.

The first lens group G1 includes, sequentially from the object side, a positive meniscus lens L11 having a convex surface facing the object side, a positive meniscus lens L12 having a convex surface facing the object side, and a cemented negative lens formed by cementing a biconvex positive lens L13 and a biconcave negative lens L14. The second lens group G2 includes, sequentially from the object side, a cemented negative lens formed by cementing a biconvex positive lens L21 and a biconcave negative lens L22, a cemented positive lens formed by cementing a biconvex positive lens L23 and a biconcave negative lens L24, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented positive lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented positive lens formed by cementing an aspheric negative lens L61 having a biconcave shape with an aspheric surface formed on a lens surface on the object side and a biconvex positive lens L62 sequentially from the object side.

An aperture stop S is disposed between the biconcave negative lens L34 and the positive meniscus lens L35 in the third lens group G3. In addition, a filter group FL is disposed between the rear lens group GL and an image plane I.

In the zoom optical system ZL2, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL2, image position correction (anti-vibration) when a camera shake occurs is performed by moving the fourth lens group G4 as the anti-vibration group Gv with a displacement component in the direction perpendicular to the optical axis.

In the zoom optical system ZL2, focusing on from an infinite distance object to a close distance object is performed by moving the fifth lens group G5 as the focusing group Gf to the image side along the optical axis.

Table 4 below shows values of specifications of the zoom optical system ZL2.

TABLE 4

| Second example | | | |
|---|---|---|---|
| [Overall specifications] | | | |
| | Wide-angle end | Intermediate focal length | Telephoto end |
| f | 185.000 | 304.999 | 582.000 |
| Fno | 5.152 | 5.287 | 6.500 |
| ω | 6.52 | 3.93 | 2.08 |
| Y | 21.630 | 21.630 | 21.630 |
| BF | 60.191 | 59.296 | 55.101 |
| BF(air-conversion length) | 59.646 | 58.751 | 54.555 |
| TL | 330.000 | 329.999 | 330.000 |
| TL(air-conversion length) | 329.455 | 329.454 | 329.455 |

| [Lens data] | | | | |
|---|---|---|---|---|
| m | r | d | nd | vd |
| Object plane | ∞ | | | |
| 1 | 199.65699 | 5.500 | 1.487490 | 70.32 |
| 2 | 870.00053 | 0.200 | | |
| 3 | 118.86881 | 10.000 | 1.496997 | 81.61 |
| 4 | 4884.78510 | 25.000 | | |
| 5 | 128.05963 | 7.100 | 1.496997 | 81.61 |
| 6 | −1061.59360 | 2.000 | 1.806099 | 33.27 |
| 7 | 140.31227 | d1 | | |
| 8 | 288.68406 | 6.000 | 1.846660 | 23.80 |
| 9 | −104.05044 | 1.500 | 1.603000 | 65.44 |
| 10 | 58.46334 | 1.524 | | |
| 11 | 65.13069 | 4.800 | 1.808090 | 22.74 |
| 12 | −156.61651 | 1.200 | 1.850260 | 32.35 |
| 13 | 72.27751 | 8.511 | | |
| 14 | −65.76029 | 1.200 | 1.921189 | 23.96 |
| 15 | 674.80181 | d2 | | |
| 16 | 125.15648 | 5.800 | 1.496997 | 81.61 |
| 17 | −86.49181 | 0.200 | | |
| 18 | 109.52756 | 4.200 | 1.496997 | 81.61 |
| 19 | −168.55272 | 0.200 | | |
| 20 | 71.85821 | 6.000 | 1.487489 | 70.44 |
| 21 | −77.90815 | 1.500 | 1.903658 | 31.32 |
| 22 | 225.53679 | 21.564 | | |
| 23 | ∞ | 10.000 | | Aperture stop S |
| 24 | −1129.22470 | 4.400 | 1.854779 | 24.80 |
| 25 | −46.62310 | 1.000 | 1.658440 | 50.84 |
| 26 | 49.39481 | d3 | | |
| 27 | 158.31945 | 4.000 | 1.719990 | 50.27 |

19

TABLE 4-continued

| | Second example | | | |
|---|---|---|---|---|
| 28 | −92.73310 | 0.200 | | |
| 29 | 32.14452 | 4.400 | 1.688930 | 31.16 |
| 30 | −142.66139 | 1.000 | 1.860740 | 23.08 |
| 31 | 43.08702 | d4 | | |
| 32 | 83.33868 | 2.000 | 1.688930 | 31.16 |
| 33 | −121.29117 | 1.000 | 1.834810 | 42.73 |
| 34 | 36.82441 | d5 | | |
| 35* | −248.87152 | 0.100 | 1.560930 | 36.64 |
| 36 | −444.63279 | 1.000 | 1.816000 | 46.59 |
| 37 | 41.36088 | 6.500 | 1.647690 | 33.72 |
| 38 | −77.63179 | d6 | | |
| 39 | ∞ | 1.600 | 1.516800 | 63.88 |
| Image plane | ∞ | | | |

| [Focal length of lens groups] | | |
|---|---|---|
| Lens group | First surface | Focal length |
| First lens group | 1 | 221.343 |
| Second lens group | 8 | −50.723 |
| Third lens group | 16 | 80.366 |
| Fourth lens group | 27 | 68.183 |
| Fifth lens group | 32 | −65.424 |
| Sixth lens group | 35 | 595.006 |

In the zoom optical system ZL2, the thirty-fifth surface is an aspheric surface. Table 5 below shows aspheric surface data, in other words, the values of the conic constant K and the aspheric surface constants A4 to A10 for the surface number m.

TABLE 5

| [Aspheric surface data] | | | | | |
|---|---|---|---|---|---|
| m | K | data] A4 | A6 | A8 | A10 |
| 35 | 1.00 | 1.59390E−06 | 4.38735E−10 | 2.13630E−12 | −4.90176E−15 |

In the zoom optical system ZL2, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 6 below shows variable spaces in the wide-angle end state, the intermediate focal length state, and the telephoto end state.

TABLE 6

| [Variable space data] | | | |
|---|---|---|---|
| | Wide-angle end | Intermediate focal length | Telephoto end |
| d1 | 22.997 | 49.485 | 58.457 |
| d2 | 66.604 | 40.116 | 1.000 |
| d3 | 6.423 | 4.200 | 4.129 |
| d4 | 2.500 | 5.237 | 15.161 |
| d5 | 21.686 | 22.066 | 46.555 |
| d6 | 58.091 | 57.197 | 53.000 |

FIG. 4 show a spherical aberration diagram, an astigmatism diagram, a distortion diagram, a lateral chromatic aberration diagram, and a coma aberration diagram of the zoom optical system ZL2 at focusing on an infinite distance object in the wide-angle end state and the telephoto end state. The aberration diagrams show that the zoom optical system ZL2 allows favorable correction of the variety of aberrations and has excellent imaging performance.

Third Example

FIG. 5 is a diagram showing the configuration of a zoom optical system ZL3 according to a third example. The zoom optical system ZL3 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having positive refractive power.

The first lens group G1 includes, sequentially from the object side, the biconvex positive lens L11 and a cemented negative lens formed by cementing a biconvex positive lens L12 and a biconcave negative lens L13. The second lens group G2 includes, sequentially from the object side, a cemented negative lens formed by cementing a biconvex positive lens L21 and a biconcave negative lens L22, a cemented positive lens formed by cementing a positive meniscus lens L23 having a convex surface facing the object side and a negative meniscus lens L24 having a convex surface facing the object side, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented negative lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented positive lens having a negative meniscus shape with a convex surface facing the object side and formed by cementing an aspheric negative lens L61 having an aspheric surface formed on a lens surface on the object side and a biconvex positive lens L62 sequentially from the object side.

An aperture stop S is disposed between the biconcave negative lens L34 and the positive meniscus lens L35 in the third lens group G3. In addition, a filter group FL is disposed between the rear lens group GL and an image plane I.

In the zoom optical system ZL3, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL3, image position correction (anti-vibration) when a camera shake occurs is performed by moving the fourth lens group G4 as the anti-vibration group Gv with a displacement component in the direction perpendicular to the optical axis.

In the zoom optical system ZL3, focusing on from an infinite distance object to a close distance object is performed by moving the fifth lens group G5 as the focusing group Gf to the image side along the optical axis.

Table 7 below shows values of specifications of the zoom optical system ZL3.

TABLE 7

| Third example | | | | |
|---|---|---|---|---|
| [Overall specifications] | | | | |
| | Wide-angle end | Inter-mediate focal length | Telephoto end | |
| f | 154.500 | 296.173 | 485.000 | |
| Fno | 5.150 | 5.334 | 6.480 | |
| ω | 7.84 | 4.05 | 2.50 | |
| Y | 21.630 | 21.630 | 21.630 | |
| BF | 59.400 | 56.396 | 53.563 | |
| BF(air-conversion length) | 58.855 | 55.851 | 53.017 | |
| TL | 320.000 | 320.000 | 319.999 | |
| TL(air-conversion length) | 319.455 | 319.455 | 319.454 | |

| [Lens data] | | | | |
|---|---|---|---|---|
| m | r | d | nd | vd |
| Object plane | ∞ | | | |
| 1 | 109.89168 | 11.500 | 1.518600 | 69.89 |
| 2 | −11921.75300 | 25.000 | | |
| 3 | 105.30936 | 9.500 | 1.496997 | 81.61 |
| 4 | −639.14794 | 2.000 | 1.795040 | 28.69 |
| 5 | 177.31407 | d1 | | |
| 6 | 250.72773 | 5.100 | 1.892860 | 20.36 |
| 7 | −136.09656 | 1.200 | 1.603000 | 65.44 |
| 8 | 61.04872 | 4.000 | | |
| 9 | 71.28310 | 5.200 | 1.808090 | 22.74 |
| 10 | 2721.85150 | 1.200 | 1.903658 | 31.32 |
| 11 | 83.32156 | 11.209 | | |
| 12 | −70.17775 | 1.200 | 1.902000 | 25.26 |
| 13 | 270.80287 | d2 | | |
| 14 | 117.97908 | 5.600 | 1.437001 | 95.10 |
| 15 | −84.42046 | 0.200 | | |
| 16 | 113.92037 | 4.700 | 1.496997 | 81.61 |
| 17 | −137.32141 | 0.200 | | |
| 18 | 75.33153 | 6.000 | 1.487489 | 70.44 |
| 19 | −75.26863 | 1.200 | 1.903658 | 31.32 |
| 20 | 311.74750 | 21.696 | | |
| 21 | ∞ | 10.000 | | Aperature stop S |
| 22 | −199.17073 | 4.400 | 1.854779 | 24.80 |
| 23 | −45.66609 | 1.000 | 1.618000 | 63.34 |
| 24 | 56.74499 | d3 | | |
| 25 | 56.79693 | 4.000 | 1.720467 | 34.71 |
| 26 | −133.19871 | 0.200 | | |
| 27 | 38.05662 | 4.400 | 1.672700 | 32.19 |
| 28 | −71.06035 | 1.000 | 1.860740 | 23.08 |
| 29 | 40.65342 | d4 | | |
| 30 | 96.07316 | 2.000 | 1.688930 | 31.16 |
| 31 | −122.75615 | 1.000 | 1.834810 | 42.73 |
| 32 | 34.74212 | d5 | | |
| 33* | 786.75543 | 0.100 | 1.560930 | 36.64 |
| 34 | 328.93291 | 1.000 | 1.816000 | 46.59 |
| 35 | 37.30304 | 7.000 | 1.647690 | 33.72 |
| 36 | −101.89055 | d6 | | |
| 37 | ∞ | 1.600 | 1.516800 | 63.88 |
| Image plane | ∞ | | | |

| [Focal length of lens groups] | | |
|---|---|---|
| Lens group | First surface | Focal length |
| First lens group G1 | 1 | 204.797 |
| Second lens group G2 | 6 | −50.756 |
| Third lens group G3 | 14 | 81.290 |

TABLE 7-continued

| Third example | | |
|---|---|---|
| Fourth lens group G4 | 25 | 68.673 |
| Fifth lens group G5 | 30 | −56.327 |
| Sixth lens group G6 | 33 | 292.990 |

In the zoom optical system ZL3, the thirty-third surface is an aspheric surface. Table 8 below shows aspheric surface data, in other words, the values of the conic constant K and the aspheric surface constants A4 to A10 for the surface number m.

TABLE 8

| m | K | A4 data] | A6 | A8 | A10 |
|---|---|---|---|---|---|
| 33 | 1.00 | 1.60977E−06 | 2.71250E−09 | −7.68774E−12 | 1.08551E−14 |

In the zoom optical system ZL3, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 9 below shows variable spaces in the wide-angle end state, the intermediate focal length state, and the telephoto end state.

TABLE 9

| [Variable space data] | | | |
|---|---|---|---|
| | Wide-angle end | Intermediate focal length | Telephoto end |
| d1 | 3.971 | 39.264 | 43.927 |
| d2 | 71.924 | 35.631 | 5.891 |
| d3 | 3.831 | 5.723 | 4.200 |
| d4 | 2.500 | 8.071 | 18.632 |
| d5 | 25.569 | 22.110 | 40.982 |
| d6 | 57.300 | 54.296 | 51.463 |

FIG. 6 show a spherical aberration diagram, an astigmatism diagram, a distortion diagram, a lateral chromatic aberration diagram, and a coma aberration diagram of the zoom optical system ZL3 at focusing on an infinite distance object in the wide-angle end state and the telephoto end state. The aberration diagrams show that the zoom optical system ZL3 allows favorable correction of the variety of aberrations and has excellent imaging performance.

Fourth Example

FIG. 7 is a diagram showing the configuration of a zoom optical system ZL4 according to a fourth example. The zoom optical system ZL4 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having positive refractive power.

The first lens group G1 includes, sequentially from the object side, a positive meniscus lens L11 having a convex surface facing the object side, a biconvex positive lens L12 and a cemented negative lens formed by cementing a biconvex positive lens L13 and a biconcave negative lens L14. The second lens group G2 includes, sequentially from the object side, a cemented negative lens formed by cementing a biconvex positive lens L21 and a biconcave negative lens L22, a cemented positive lens formed by cementing a biconvex positive lens L23 and a biconcave negative lens L24, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a biconvex positive lens L35 and a biconcave negative lens L36. The fourth lens group G4 includes, sequentially from the object side, a biconvex positive lens L41 and a cemented positive lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented positive lens formed by cementing an aspheric negative lens L61 having a biconcave shape with an aspheric surface formed on a lens surface on the object side and a biconvex positive lens L62 sequentially from the object side.

An aperture stop S is disposed between the biconcave negative lens L34 and the biconvex positive lens L35 in the third lens group G3. In addition, a filter group FL is disposed between the rear lens group GL and an image plane I.

In the zoom optical system ZL4, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL4, image position correction (anti-vibration) when a camera shake occurs is performed by moving the fourth lens group G4 as the anti-vibration group Gv with a displacement component in the direction perpendicular to the optical axis.

In the zoom optical system ZL4, focusing on from an infinite distance object to a close distance object is performed by moving the fifth lens group G5 as the focusing group Gf to the image side along the optical axis.

Table 10 below shows values of specifications of the zoom optical system ZL4.

TABLE 10

Fourth example

[Overall specifications]

|  | Wide-angle end | Intermediate length focal | Telephoto end |
| --- | --- | --- | --- |
| f | 206.000 | 338.504 | 679.001 |
| Fno | 5.768 | 5.779 | 8.061 |
| ω | 5.85 | 3.55 | 1.78 |

TABLE 10-continued

Fourth example

|  |  |  |  |
| --- | --- | --- | --- |
| Y | 21.630 | 21.630 | 21.630 |
| BF | 69.874 | 66.556 | 56.349 |
| BF (air-conversion length) | 69.329 | 66.011 | 55.804 |
| TL | 350.000 | 350.000 | 350.000 |
| TL(air-conversion length) | 349.455 | 349.455 | 349.455 |

[Lens data]

| m | r | d | nd | vd |
| --- | --- | --- | --- | --- |
| Object plane | ∞ |  |  |  |
| 1 | 199.65699 | 5.500 | 1.487490 | 70.32 |
| 2 | 870.00053 | 0.200 |  |  |
| 3 | 125.74649 | 10.000 | 1.496997 | 81.61 |
| 4 | −6240.68890 | 25.000 |  |  |
| 5 | 135.83992 | 7.100 | 1.496997 | 81.61 |
| 6 | −597.25343 | 2.000 | 1.806099 | 33.27 |
| 7 | 158.15411 | d1 |  |  |
| 8 | 228.55470 | 6.000 | 1.846660 | 23.80 |
| 9 | −109.51878 | 1.500 | 1.603000 | 65.44 |
| 10 | 57.52324 | 1.524 |  |  |
| 11 | 64.67604 | 4.800 | 1.808090 | 22.74 |
| 12 | −169.80932 | 1.200 | 1.850260 | 32.35 |
| 13 | 67.79568 | 8.638 |  |  |
| 14 | −66.20801 | 1.200 | 1.921189 | 23.96 |
| 15 | 663.39753 | d2 |  |  |
| 16 | 107.04018 | 5.800 | 1.496997 | 81.61 |
| 17 | −94.60917 | 0.200 |  |  |
| 18 | 114.97574 | 4.200 | 1.496997 | 81.61 |
| 19 | −182.21043 | 0.200 |  |  |
| 20 | 69.47396 | 6.000 | 1.487489 | 70.44 |
| 21 | −79.09053 | 1.500 | 1.903658 | 31.32 |
| 22 | 192.62875 | 20.496 |  |  |
| 23 | ∞ | 10.000 |  | Aperture stop S |
| 24 | 9683.25180 | 4.400 | 1.854779 | 24.80 |
| 25 | −49.09864 | 1.000 | 1.658440 | 50.84 |
| 26 | 47.84612 | d3 |  |  |
| 27 | 402.72567 | 4.000 | 1.719990 | 50.27 |
| 28 | −87.36308 | 2.024 |  |  |
| 29 | 34.01137 | 4.400 | 1.688930 | 31.16 |
| 30 | −127.94458 | 1.000 | 1.860740 | 23.08 |
| 31 | 49.12405 | d4 |  |  |
| 32 | 94.39480 | 2.000 | 1.688930 | 31.16 |
| 33 | −147.35376 | 1.000 | 1.834810 | 42.73 |
| 34 | 42.71705 | d5 |  |  |
| 35* | −180.66760 | 0.100 | 1.560930 | 36.64 |
| 36 | −265.53822 | 1.000 | 1.816000 | 46.59 |
| 37 | 35.91344 | 6.500 | 1.647690 | 33.72 |
| 38 | −73.75303 | d6 |  |  |
| 39 | ∞ | 1.600 | 1.516800 | 63.88 |
| Image plane | ∞ |  |  |  |

[Focal length of lens groups]

| Lens group | First surface | Focal length |
| --- | --- | --- |
| First lens group G1 | 1 | 218.072 |
| Second lens group G2 | 8 | −50.806 |
| Third lens group G3 | 16 | 85.529 |
| Fourth lens group G4 | 27 | 76.432 |
| Fifth lens group G5 | 32 | −76.984 |
| Sixth lens group G6 | 35 | 2912.201 |

In the zoom optical system ZL4, the thirty-fifth surface is an aspheric surface. Table 11 below shows aspheric surface data, in other words, the values of the conic constant K and the aspheric surface constants A4 to A10 for the surface number m.

TABLE 11

| | | [Aspheric surface data] | | |
|---|---|---|---|---|
| m | K | A4 | A6 | A8 | A10 |
| 35 | 1.00 | 1.44736E−06 | 7.44821E−10 | 6.68958E−13 | −1.03489E−15 |

In the zoom optical system ZL4, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 12 below shows variable spaces in the wide-angle end state, the intermediate focal length state, and the telephoto end state.

TABLE 12

| | [Variable space data] | | |
|---|---|---|---|
| | Wide-angle end | Intermediate focal length | Telephoto end |
| d1 | 26.753 | 52.931 | 60.680 |
| d2 | 73.789 | 47.610 | 1.000 |
| d3 | 4.200 | 5.635 | 9.746 |
| d4 | 2.500 | 3.988 | 16.199 |
| d5 | 22.402 | 22.797 | 55.544 |
| d6 | 67.774 | 64.456 | 54.249 |

FIG. 8 show a spherical aberration diagram, an astigmatism diagram, a distortion diagram, a lateral chromatic aberration diagram, and a coma aberration diagram of the zoom optical system ZL4 at focusing on an infinite distance object in the wide-angle end state and the telephoto end state. The aberration diagrams show that the zoom optical system ZL4 allows favorable correction of the variety of aberrations and has excellent imaging performance.

Fifth Example

FIG. 9 is a diagram showing the configuration of a zoom optical system ZL5 according to a fifth example. The zoom optical system ZL5 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having positive refractive power.

The first lens group G1 includes, sequentially from the object side, a biconvex positive lens L11 and a cemented positive lens formed by cementing a biconvex positive lens L12 and a biconcave negative lens L13. The second lens group G2 includes, sequentially from the object side, a cemented negative lens formed by cementing a biconvex positive lens L21 and a biconcave negative lens L22, a cemented positive lens formed by cementing a positive meniscus lens L23 having a convex surface facing the object side and a negative meniscus lens L24 having a convex surface facing the object side, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented negative lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented positive lens having a negative meniscus shape with a convex surface facing the object side and formed by cementing an aspheric negative lens L61 having an aspheric surface formed on a lens surface on the object side and a biconvex positive lens L62 sequentially from the object side.

An aperture stop S is disposed between the biconcave negative lens L34 and the positive meniscus lens L35 in the third lens group G3. In addition, a filter group FL is disposed between the rear lens group GL and an image plane I.

In the zoom optical system ZL5, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL5, image position correction (anti-vibration) when a camera shake occurs is performed by moving the fourth lens group G4 as the anti-vibration group Gv with a displacement component in the direction perpendicular to the optical axis.

In the zoom optical system ZL5, focusing on from an infinite distance object to a close distance object is performed by moving the fifth lens group G5 as the focusing group Gf to the image side along the optical axis.

Table 13 below shows values of specifications of the zoom optical system ZL5.

TABLE 13

| Fifth example | | | |
|---|---|---|---|
| [Overall specifications] | | | |
| | Wide-angle end | Intermediate focal length | Telephoto end |
| f | 206.000 | 295.398 | 484.999 |
| Fno | 5.150 | 5.364 | 6.482 |
| ω | 5.84 | 4.06 | 2.50 |

TABLE 13-continued

| Fifth example | | | | |
|---|---|---|---|---|
| Y | 21.630 | 21.630 | 21.630 | |
| BF | 62.638 | 58.331 | 54.193 | |
| BF(air-conversion length) | 62.093 | 57.786 | 53.648 | |
| TL | 306.000 | 306.000 | 306.000 | |
| TL(air-conversion length) | 305.455 | 305.455 | 305.455 | |

| [Lens data] | | | | |
|---|---|---|---|---|
| m | r | d | nd | νd |
| Object plane | ∞ | | | |
| 1 | 112.63116 | 11.500 | 1.518600 | 69.89 |
| 2 | −6427.39710 | 25.000 | | |
| 3 | 94.39021 | 9.500 | 1.496997 | 81.61 |
| 4 | −2714.42750 | 2.000 | 1.795040 | 28.69 |
| 5 | 157.60583 | d1 | | |
| 6 | 245.33581 | 5.100 | 1.892860 | 20.36 |
| 7 | −133.77042 | 1.200 | 1.603000 | 65.44 |
| 8 | 59.07330 | 4.000 | | |
| 9 | 68.83954 | 5.200 | 1.808090 | 22.74 |
| 10 | 656.79367 | 1.200 | 1.903658 | 31.32 |
| 11 | 81.34842 | 6.418 | | |
| 12 | −78.39816 | 1.200 | 1.902000 | 25.26 |
| 13 | 196.81417 | d2 | | |
| 14 | 159.87776 | 5.600 | 1.437001 | 95.10 |
| 15 | −83.33381 | 0.200 | | |
| 16 | 84.94804 | 4.700 | 1.496997 | 81.61 |
| 17 | −137.07495 | 0.200 | | |
| 18 | 75.59916 | 6.000 | 1.487489 | 70.44 |
| 19 | −84.50304 | 1.200 | 1.903658 | 31.32 |
| 20 | 250.83493 | 23.715 | | |
| 21 | ∞ | 10.000 | | Aperture stop S |
| 22 | −166.06414 | 4.400 | 1.854779 | 24.80 |
| 23 | −45.80045 | 1.000 | 1.618000 | 63.34 |
| 24 | 55.58065 | d3 | | |
| 25 | 54.57757 | 4.000 | 1.720467 | 34.71 |
| 26 | −130.35013 | 0.200 | | |
| 27 | 37.07653 | 4.400 | 1.672700 | 32.19 |
| 28 | −68.45113 | 1.000 | 1.860740 | 23.08 |
| 29 | 39.45171 | d4 | | |
| 30 | 100.87591 | 2.000 | 1.688930 | 31.16 |
| 31 | −136.99706 | 1.000 | 1.834810 | 42.73 |
| 32 | 35.15552 | d5 | | |
| 33* | 602.89640 | 0.100 | 1.560930 | 36.64 |
| 34 | 291.73653 | 1.000 | 1.816000 | 46.59 |
| 35 | 37.17378 | 7.000 | 1.647690 | 33.72 |
| 36 | −105.27614 | d6 | | |
| 37 | ∞ | 1.600 | 1.516800 | 63.88 |
| Image plane | ∞ | | | |

| [Focal length of lens groups] | | |
|---|---|---|
| Lens group | First surface | Focal length |
| First lens group G1 | 1 | 195.061 |
| Second lens group G2 | 6 | −51.823 |
| Third lens group G3 | 14 | 76.696 |
| Fourth lens group G4 | 25 | 66.294 |
| Fifth lens group G5 | 30 | −56.477 |
| Sixth lens group G6 | 33 | 285.826 |

In the zoom optical system ZL5, the thirty-third surface is an aspheric surface. Table 14 below shows aspheric surface data, in other words, the values of the conic constant K and the aspheric surface constants A4 to A10 for the surface number m.

TABLE 14

| [Aspheric surface data] | | | | |
| --- | --- | --- | --- | --- |
| m | K | A4 | A6 | A8 | A10 |
| 33 | 1.00 | 1.59106E−06 | 3.27161E−09 | −1.06659E−11 | 1.58785E−14 |

In the zoom optical system ZL5, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 15 below shows variable spaces in the wide-angle end state, the intermediate focal length state, and the telephoto end state.

TABLE 15

| [Variable space data] | | | |
| --- | --- | --- | --- |
| | Wide-angle end | Intermediate focal length | Telephoto end |
| d1 | 17.823 | 33.918 | 39.217 |
| d2 | 50.844 | 30.221 | 1.000 |
| d3 | 4.209 | 7.333 | 4.200 |
| d4 | 2.500 | 5.537 | 16.148 |
| d5 | 17.952 | 20.626 | 41.209 |
| d6 | 60.539 | 56.231 | 52.093 |

FIG. 10 show a spherical aberration diagram, an astigmatism diagram, a distortion diagram, a lateral chromatic aberration diagram, and a coma aberration diagram of the zoom optical system ZL5 at focusing on an infinite distance object in the wide-angle end state and the telephoto end state. The aberration diagrams show that the zoom optical system ZL5 allows favorable correction of the variety of aberrations and has excellent imaging performance.

Sixth Example

FIG. 11 is a diagram showing the configuration of a zoom optical system ZL6 according to a sixth example. The zoom optical system ZL6 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, and a sixth lens group G6 having negative refractive power.

The first lens group G1 includes, sequentially from the object side, a positive meniscus lens L11 having a convex surface facing the object side, a biconvex positive lens L12 and a cemented negative lens formed by cementing a biconvex positive lens L13 and a biconcave negative lens L14. The second lens group G2 includes, sequentially from the object side, a cemented negative lens formed by cementing a biconvex positive lens L21 and a biconcave negative lens L22, a cemented positive lens formed by cementing a biconvex positive lens L23 and a biconcave negative lens L24, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented positive lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented negative lens formed by cementing an aspheric negative lens L61 having a biconcave shape with an aspheric surface formed on a lens surface on the object side and a biconvex positive lens L62 sequentially from the object side.

An aperture stop S is disposed between the biconcave negative lens L34 and the positive meniscus lens L35 in the third lens group G3. In addition, a filter group FL is disposed between the rear lens group GL and an image plane I. In the zoom optical system ZL6, the second lens group G2, the third lens group G3, the fourth lens group G4, the fifth lens group G5, and the sixth lens group G6 move along the optical axis so that the spaces between the lens groups change at zooming. The first lens group G1 is fixed relative to the image plane I at zooming.

In the zoom optical system ZL6, image position correction (anti-vibration) when a camera shake occurs is performed by moving the fourth lens group G4 as the anti-vibration group Gv with a displacement component in the direction perpendicular to the optical axis.

In the zoom optical system ZL6, focusing on from an infinite distance object to a close distance object is performed by moving the fifth lens group G5 as the focusing group Gf to the image side along the optical axis.

Table 16 below shows values of specifications of the zoom optical system ZL6.

TABLE 16

| Sixth example | | |
| --- | --- | --- |
| [Overall specifications] | | |
| | Wide-angle end | Intermediate focal length | Telephoto end |
| f | 206.000 | 332.574 | 679.001 |
| Fno | 5.598 | 5.596 | 7.702 |

TABLE 16-continued

| Sixth example | | | |
|---|---|---|---|
| ω | 5.87 | 3.62 | 1.79 |
| Y | 21.630 | 21.630 | 21.630 |
| BF | 65.838 | 64.252 | 122.246 |
| BF (air-conversion length) | 65.293 | 63.707 | 121.701 |
| TL | 350.000 | 350.000 | 350.000 |
| TL(air-conversion length) | 349.455 | 349.455 | 349.455 |

| [Lens data] | | | | |
|---|---|---|---|---|
| m | r | d | nd | νd |
| Object plane | ∞ | | | |
| 1 | 199.65699 | 5.500 | 1.487490 | 70.30 |
| 2 | 870.00053 | 0.200 | | |
| 3 | 120.83520 | 10.000 | 1.496997 | 81.60 |
| 4 | −6077.90170 | 15.000 | | |
| 5 | 140.33059 | 7.100 | 1.496997 | 81.60 |
| 6 | −774.66098 | 2.000 | 1.806099 | 33.20 |
| 7 | 163.61217 | d1 | | |
| 8 | 225.41580 | 6.000 | 1.846660 | 23.80 |
| 9 | −110.15488 | 1.500 | 1.603000 | 65.40 |
| 10 | 55.84766 | 1.524 | | |
| 11 | 58.57424 | 4.800 | 1.808090 | 22.70 |
| 12 | −1240.16080 | 1.200 | 1.850260 | 32.30 |
| 13 | 62.43379 | 12.645 | | |
| 14 | −61.79699 | 1.200 | 1.921189 | 23.90 |
| 15 | 1297.67340 | d2 | | |
| 16 | 106.91200 | 5.800 | 1.496997 | 81.60 |
| 17 | −93.68419 | 0.200 | | |
| 18 | 126.09374 | 4.200 | 1.496997 | 81.60 |
| 19 | −181.31294 | 0.200 | | |
| 20 | 70.57798 | 6.000 | 1.487489 | 70.40 |
| 21 | −78.01209 | 1.500 | 1.903658 | 31.30 |
| 22 | 234.36861 | 20.531 | | |
| 23 | ∞ | 10.000 | | Aperture stop S |
| 24 | −1703.35100 | 4.400 | 1.854779 | 24.80 |
| 25 | −46.72121 | 1.000 | 1.658440 | 50.80 |
| 26 | 45.47166 | d3 | | |
| 27 | 742.39834 | 4.000 | 1.719990 | 50.20 |
| 28 | −80.64699 | 1.007 | | |
| 29 | 34.04211 | 4.400 | 1.688930 | 31.10 |
| 30 | −118.58376 | 1.000 | 1.860740 | 23.00 |
| 31 | 51.10412 | d4 | | |
| 32 | 90.09316 | 2.000 | 1.688930 | 31.10 |
| 33 | −165.28520 | 1.000 | 1.834810 | 42.70 |
| 34 | 43.10143 | d5 | | |
| 35* | −222.28646 | 0.100 | 1.560930 | 36.60 |
| 36 | −366.35285 | 1.000 | 1.816000 | 46.50 |
| 37 | 33.88278 | 6.500 | 1.647690 | 33.70 |
| 38 | −81.90306 | d6 | | |
| 39 | ∞ | 1.600 | 1.516800 | 63.80 |
| Image plane | ∞ | | | |

| [Focal length of lens Lens groups] | | |
|---|---|---|
| Lens group | First surface | Focal length |
| First lens group G1 | 1 | 209.167 |
| Second lens group G2 | 8 | 50.184 |
| Third lens group G3 | 16 | 86.564 |
| Fourth lens group G4 | 27 | 74.177 |
| Fifth lens group G5 | 32 | −80.976 |
| Sixth lens group G6 | 35 | −56114.006 |

In the zoom optical system ZL6, the thirty-fifth surface is an aspheric surface. Table 17 below shows aspheric surface data, in other words, the values of the conic constant K and the aspheric surface constants A4 to A10 for the surface number m.

TABLE 17

[Aspheric surface data]

| m | K | A4 | A6 | A8 | A10 |
|---|---|---|---|---|---|
| 35 | 1.00 | 1.81575E−06 | −3.86294E−10 | 7.26574E−12 | −1.32629E−14 |

In the zoom optical system ZL6, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, and an on-axis air space d6 between the sixth lens group G6 and the filter group FL change at zooming. Table 18 below shows variable spaces in the wide-angle end state, the intermediate focal length state, and the telephoto end state.

TABLE 18

[Variable space data]

| | Wide-angle end | Intermediate focal length | Telephoto end |
|---|---|---|---|
| d1 | 32.126 | 56.552 | 65.499 |
| d2 | 74.374 | 49.804 | 1.000 |
| d3 | 4.200 | 4.932 | 11.029 |
| d4 | 2.500 | 3.043 | 12.974 |
| d5 | 27.455 | 27.827 | 55.943 |
| d6 | 63.738 | 62.235 | 57.946 |

FIG. 12 show a spherical aberration diagram, an astigmatism diagram, a distortion diagram, a lateral chromatic aberration diagram, and a coma aberration diagram of the zoom optical system ZL6 at focusing on an infinite distance object in the wide-angle end state and the telephoto end state. The aberration diagrams show that the zoom optical system ZL6 allows favorable correction of the variety of aberrations and has excellent imaging performance.

Seventh Example

FIG. 13 is a diagram showing the configuration of a zoom optical system ZL7 according to a seventh example. The zoom optical system ZL7 includes, sequentially from the object side, a first lens group G1 having positive refractive power, a second lens group G2 having negative refractive power, and a rear lens group GL. The rear lens group GL includes, sequentially from the object side, a third lens group G3 having negative refractive power, a fourth lens group G4 having positive refractive power, a fifth lens group G5 having positive refractive power, a sixth lens group G6 having negative refractive power, and a seventh lens group G7 having negative refractive power.

The first lens group G1 includes, sequentially from the object side, a positive meniscus lens L11 having a convex surface facing the object side, a biconvex positive lens L12 and a cemented negative lens formed by cementing a biconvex positive lens L13 and a biconcave negative lens L14. The second lens group G2 includes, sequentially from the object side, a cemented negative lens formed by cementing a biconvex positive lens L21 and a biconcave negative lens L22, and a cemented positive lens formed by cementing a biconvex positive lens L23 and a biconcave negative lens L24. The third lens group G3 includes a biconcave negative lens L31. The fourth lens group G4 includes, sequentially from the object side, a biconvex positive lens L41, a biconvex positive lens L42, a cemented negative lens formed by cementing a biconvex positive lens L43 and a biconcave negative lens L44, and a cemented negative lens formed by cementing a positive meniscus lens L45 having a concave surface facing the object side and a biconcave negative lens L46. The fifth lens group G5 includes, sequentially from the object side, a biconvex positive lens L51 and a cemented positive lens formed by cementing a biconvex positive lens L52 and a biconcave negative lens L53. The sixth lens group G6 includes a cemented negative lens formed by cementing a biconvex positive lens L61 and a biconcave negative lens L62 sequentially from the object side. The seventh lens group G7 includes a cemented negative lens formed by cementing an aspheric negative lens L71 having a biconcave shape with an aspheric surface formed on a lens surface on the object side and a biconvex positive lens L72 sequentially from the object side.

An aperture stop S is disposed between the biconcave negative lens L44 and the positive meniscus lens L45 in the fourth lens group G4. In addition, a filter group FL is disposed between the rear lens group GL and an image plane I.

In the zoom optical system ZL7, the second lens group G2, the third lens group G3, the fourth lens group G4, the fifth lens group G5, the sixth lens group G6, and the seventh lens group G7 move along the optical axis so that the spaces between the lens groups change at zooming. The first lens group G1 is fixed relative to the image plane I at zooming.

In the zoom optical system ZL7, image position correction (anti-vibration) when a camera shake occurs is performed by moving the fifth lens group G5 as the anti-vibration group Gv with a displacement component in the direction perpendicular to the optical axis.

In the zoom optical system ZL7, focusing on from an infinite distance object to a close distance object is performed by moving the sixth lens group G6 as the focusing group Gf to the image side along the optical axis.

Table 19 below shows values of specifications of the zoom optical system ZL7.

TABLE 19

Seventh example

[Overall specifications]

| | Wide-angle end | Intermediate focal length | Telephoto end |
|---|---|---|---|
| f | 190.685 | 360.000 | 679.000 |
| Fno | 5.601 | 5.661 | 7.702 |
| ω | 6.35 | 3.35 | 1.79 |
| Y | 21.630 | 21.630 | 21.630 |
| BF | 74.877 | 71.456 | 63.873 |
| BF(air-conversion length) | 74.332 | 70.911 | 63.328 |

TABLE 19-continued

| Seventh example | | | |
|---|---|---|---|
| TL | 350.000 | 350.000 | 350.000 |
| TL(air-conversion length) | 349.455 | 349.455 | 349.455 |

[Lens data]

| m | r | d | nd | νd |
|---|---|---|---|---|
| Object plane | ∞ | | | |
| 1 | 199.65699 | 5.500 | 1.487490 | 70.32 |
| 2 | 870.00053 | 0.200 | | |
| 3 | 128.66663 | 10.000 | 1.496997 | 81.61 |
| 4 | −1459.51630 | 21.000 | | |
| 5 | 166.51797 | 7.100 | 1.496997 | 81.61 |
| 6 | −319.20777 | 2.000 | 1.806099 | 33.27 |
| 7 | 191.60966 | d1 | | |
| 8 | 215.83903 | 6.000 | 1.846660 | 23.80 |
| 9 | −100.62825 | 1.500 | 1.603000 | 65.44 |
| 10 | 55.76061 | 1.524 | | |
| 11 | 66.99117 | 4.800 | 1.808090 | 22.74 |
| 12 | −148.83089 | 1.200 | 1.850260 | 32.35 |
| 13 | 71.74054 | d2 | | |
| 14 | −66.75644 | 1.200 | 1.921189 | 23.96 |
| 15 | 841.17757 | d3 | | |
| 16 | 99.52613 | 5.800 | 1.496997 | 81.61 |
| 17 | −105.03727 | 0.200 | | |
| 18 | 94.03032 | 4.200 | 1.496997 | 81.61 |
| 19 | −218.92401 | 0.200 | | |
| 20 | 68.84351 | 6.000 | 1.487489 | 70.44 |
| 21 | −84.71142 | 1.500 | 1.903658 | 31.32 |
| 22 | 165.88652 | 15.062 | | |
| 23 | ∞ | 10.000 | | Aperture stop S |
| 24 | −2175.75670 | 4.400 | 1.854779 | 24.80 |
| 25 | 53.97324 | 1.000 | 1.658440 | 50.84 |
| 26 | 48.43659 | d4 | | |
| 27 | 189.43215 | 4.000 | 1.719990 | 50.27 |
| 28 | −102.22848 | 1.071 | | |
| 29 | 35.90682 | 4.400 | 1.688930 | 31.16 |
| 30 | −157.04433 | 1.000 | 1.860740 | 23.08 |
| 31 | 49.37418 | d5 | | |
| 32 | 85.45977 | 2.000 | 1.688930 | 31.16 |
| 33 | −175.34295 | 1.000 | 1.834810 | 42.73 |
| 34 | 42.18567 | d6 | | |
| 35* | −160.31480 | 0.100 | 1.560930 | 36.64 |
| 36 | −223.78190 | 1.000 | 1.816000 | 46.59 |
| 37 | 37.74525 | 6.500 | 1.647690 | 33.72 |
| 38 | −74.00964 | d7 | | |
| 39 | ∞ | 1.600 | 1.516800 | 63.88 |
| Image plane | ∞ | | | |

[Focal length of lens groups]

| Lens group | First surface | Focal length |
|---|---|---|
| First lens group G1 | 1 | 223.563 |
| Second lens group G2 | 8 | −245.757 |
| Third lens group G3 | 14 | −67.097 |
| Fourth lens group G4 | 16 | 92.816 |
| Fifth lens group G5 | 27 | 76.202 |
| Sixth lens group G6 | 32 | −81.403 |
| Seventh lens group G7 | 35 | −49458.500 |

In the zoom optical system ZL7, the thirty-fifth surface is an aspheric surface. Table 20 below shows aspheric surface data, in other words, the values of the conic constant K and the aspheric surface constants A4 to A10 for the surface number m.

TABLE 20

| [Aspheric surface data] | | | | | |
|---|---|---|---|---|---|
| m | K | A4 | A6 | A8 | A10 |
| 35 | 1.00 | 1.51773E−06 | 5.81173E−10 | 9.41588E−13 | −1.64693E−15 |

In the zoom optical system ZL7, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, an on-axis air space d6 between the sixth lens group G6 and the seventh lens group G7, and an on-axis air space d7 between the seventh lens group G7 and the filter group FL change at zooming. Table 21 below shows variable spaces in the wide-angle end state, the intermediate focal length state, and the telephoto end state.

TABLE 21

| [Variable space data] | | | |
|---|---|---|---|
| | Wide-angle end | Intermediate focal length | Telephoto end |
| d1 | 31.704 | 63.236 | 68.135 |
| d2 | 6.000 | 9.000 | 10.000 |
| d3 | 80.911 | 45.287 | 1.000 |
| d4 | 4.200 | 5.392 | 8.803 |
| d5 | 4.109 | 5.252 | 13.884 |
| d6 | 16.742 | 18.919 | 52.847 |
| d7 | 72.777 | 69.356 | 61.773 |

FIG. 14 show a spherical aberration diagram, an astigmatism diagram, a distortion diagram, a lateral chromatic aberration diagram, and a coma aberration diagram of the zoom optical system ZL7 at focusing on an infinite distance object in the wide-angle end state and the telephoto end state. The aberration diagrams show that the zoom optical system ZL7 allows favorable correction of the variety of aberrations and has excellent imaging performance.

Eighth Example

FIG. 15 is a diagram showing the configuration of a zoom optical system ZL8 according to an eighth example. The zoom optical system ZL8 includes, sequentially from the object side, a first lens group G1 having positive refractive power, a second lens group G2 having negative refractive power, and a rear lens group GL. The rear lens group GL includes, sequentially from the object side, a third lens group G3 having positive refractive power, a fourth lens group G4 having positive refractive power, a fifth lens group G5 having negative refractive power, a sixth lens group G6 having positive refractive power, and a seventh lens group G7 having negative refractive power.

The first lens group G1 includes, sequentially from the object side, a positive meniscus lens L11 having a convex surface facing the object side, a positive meniscus lens L12 having a convex surface facing the object side, and a cemented negative lens formed by cementing a biconvex positive lens L13 and a biconcave negative lens L14. The second lens group G2 includes, sequentially from the object side, a cemented negative lens formed by cementing a biconvex positive lens L21 and a biconcave negative lens L22, a cemented positive lens formed by cementing a biconvex positive lens L23 and a biconcave negative lens L24, and a biconcave negative lens L25. The third lens group G3 includes, sequentially from the object side, a biconvex positive lens L31, a biconvex positive lens L32, a cemented negative lens formed by cementing a biconvex positive lens L33 and a biconcave negative lens L34, and a cemented negative lens formed by cementing a positive meniscus lens L35 having a concave surface facing the object side and a biconcave negative lens L36. The fourth lens group G4 includes, sequentially from the object side, a biconvex positive lens L41 and a cemented positive lens formed by cementing a biconvex positive lens L42 and a biconcave negative lens L43. The fifth lens group G5 includes a cemented negative lens formed by cementing a biconvex positive lens L51 and a biconcave negative lens L52 sequentially from the object side. The sixth lens group G6 includes a cemented positive lens having a negative meniscus shape with a concave surface facing the object side and formed by cementing an aspheric negative lens L61 having an aspheric surface formed on a lens surface on the object side and a biconvex positive lens L62 sequentially from the object side. The seventh lens group G7 includes a plano-concave negative lens L71 having a concave surface facing the image plane side.

An aperture stop S is disposed between the biconcave negative lens L34 and the positive meniscus lens L35 in the third lens group G3. In addition, a filter group FL is disposed between the rear lens group GL and an image plane I.

In the zoom optical system ZL7, the second lens group G2, the third lens group G3, the fourth lens group G4, the fifth lens group G5, the sixth lens group G6, and the seventh lens group G7 move along the optical axis so that the spaces between the lens groups change at zooming. The first lens group G1 is fixed relative to the image plane I at zooming.

In the zoom optical system ZL7, image position correction (anti-vibration) when a camera shake occurs is performed by moving the fourth lens group G4 as the anti-vibration group Gv with a displacement component in the direction perpendicular to the optical axis.

In the zoom optical system ZL7, focusing on from an infinite distance object to a close distance object is performed by moving the fifth lens group G5 as the focusing group Gf to the image side along the optical axis.

Table 22 below shows values of specifications of the zoom optical system ZL8.

TABLE 22

| Eighth example | | | |
|---|---|---|---|
| [Overall specifications] | | | |
| | Wide-angle end | Intermediate focal length | Telephoto end |
| f | 206.000 | 349.178 | 679.000 |
| Fno | 5.600 | 5.667 | 7.700 |
| ω | 5.87 | 3.45 | 1.79 |
| Y | 21.630 | 21.630 | 21.630 |
| BF | 62.645 | 62.466 | 62.555 |
| BF(air-conversion length) | 62.100 | 61.921 | 62.010 |
| TL | 350.000 | 350.000 | 350.000 |
| TL(air-conversion length) | 349.455 | 349.455 | 349.455 |

| [Lens data] | | | |
|---|---|---|---|
| m | r | d | nd | vd |
|---|---|---|---|---|
| Object plane | ∞ | | | |
| 1 | 199.65699 | 5.500 | 1.487490 | 70.32 |
| 2 | 870.00053 | 0.200 | | |
| 3 | 120.33194 | 10.000 | 1.496997 | 81.61 |
| 4 | 27574.90200 | 22.000 | | |
| 5 | 134.38217 | 7.100 | 1.496997 | 81.61 |
| 6 | −720.08206 | 2.000 | 1.806099 | 33.27 |
| 7 | 157.03441 | d1 | | |
| 8 | 228.93734 | 6.000 | 1.846660 | 23.80 |
| 9 | −114.21937 | 1.500 | 1.603000 | 65.44 |
| 10 | 55.94416 | 1.524 | | |
| 11 | 65.30486 | 4.800 | 1.808090 | 22.74 |
| 12 | −205.54332 | 1.200 | 1.850260 | 32.35 |
| 13 | 68.92805 | 10.429 | | |
| 14 | −64.80801 | 1.200 | 1.921189 | 23.96 |
| 15 | 1483.14680 | d2 | | |
| 16 | 104.99405 | 5.800 | 1.496997 | 81.61 |
| 17 | −89.82110 | 0.200 | | |
| 18 | 123.52811 | 4.200 | 1.496997 | 81.61 |
| 19 | −189.13537 | 0.200 | | |
| 20 | 72.70242 | 6.000 | 1.487489 | 70.44 |
| 21 | −73.20487 | 1.500 | 1.903658 | 31.32 |
| 22 | 192.86458 | 19.855 | | |
| 23 | ∞ | 10.000 | | Aperture stop S |

TABLE 22-continued

| | | Eighth example | | |
|---|---|---|---|---|
| 24 | −7500.20550 | 4.400 | 1.854779 | 24.80 |
| 25 | −47.26357 | 1.000 | 1.658440 | 50.84 |
| 26 | 50.22911 | d3 | | |
| 27 | 682.82542 | 4.000 | 1.719990 | 50.27 |
| 28 | −84.11431 | 1.802 | | |
| 29 | 34.65118 | 4.400 | 1.688930 | 31.16 |
| 30 | −115.99702 | 1.000 | 1.860740 | 23.08 |
| 31 | 52.01736 | d4 | | |
| 32 | 76.97765 | 2.000 | 1.688930 | 31.16 |
| 33 | −461.73538 | 1.000 | 1.834810 | 42.73 |
| 34 | 42.19461 | d5 | | |
| 35* | −201.45277 | 0.100 | 1.560930 | 36.64 |
| 36 | −313.00355 | 1.000 | 1.816000 | 46.59 |
| 37 | 43.36113 | 6.500 | 1.647690 | 33.72 |
| 38 | −66.78891 | d6 | | |
| 39 | ∞ | 1.500 | 1.516800 | 63.88 |
| 40 | 150.00000 | d7 | | |
| 41 | ∞ | 1.600 | 1.516800 | 63.88 |
| Image plane | ∞ | | | |

| | [Focal length of lens groups] | |
|---|---|---|
| Lens group | First surface | Focal length |
| First lens group G1 | 1 | 211.895 |
| Second lens group G2 | 8 | −50.789 |
| Third lens group G3 | 16 | 91.777 |
| Fourth lens group G4 | 27 | 76.789 |
| Fifth lens group G5 | 32 | −92.210 |
| Sixth lens group G6 | 35 | 397.522 |
| Seventh lens group G7 | 39 | −290.248 |

In the zoom optical system ZL8, the thirty-fifth surface is an aspheric surface. Table 23 below shows aspheric surface data, in other words, the values of the conic constant K and the aspheric surface constants A4 to A10 for the surface number m.

TABLE 23

| | | [Aspheric surface data] | | | |
|---|---|---|---|---|---|
| m | K | A4 | A6 | A8 | A10 |
| 35 | 1.00 | 6.23272E−07 | 4.57420E−10 | −8.07994E−13 | 1.79217E−15 |

In the zoom optical system ZL8, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the sixth lens group G6, an on-axis air space d6 between the sixth lens group G6 and the seventh lens group G7, and an on-axis air space d7 between the seventh lens group G7 and the filter group FL change at zooming. Table 24 below shows variable spaces in the wide-angle end state, the intermediate focal length state, and the telephoto end state.

TABLE 24

| | [Variable space data] | | |
|---|---|---|---|
| | Wide-angle end | Intermediate focal length | Telephoto end |
| d1 | 29.369 | 54.807 | 61.392 |
| d2 | 73.022 | 45.442 | 1.000 |
| d3 | 4.115 | 5.698 | 4.200 |
| d4 | 2.500 | 2.500 | 8.850 |
| d5 | 21.782 | 25.652 | 61.893 |
| d6 | 6.656 | 3.524 | 0.200 |
| d7 | 60.545 | 60.366 | 60.455 |

FIG. 16 show a spherical aberration diagram, an astigmatism diagram, a distortion diagram, a lateral chromatic aberration diagram, and a coma aberration diagram of the zoom optical system ZL8 at focusing on an infinite distance object in the wide-angle end state and the telephoto end state. The aberration diagrams show that the zoom optical system ZL8 allows favorable correction of the variety of aberrations and has excellent imaging performance.

[Condition Expression Correspondence Value]

Table 25 below shows correspondence values of Conditional Expressions (1) to (12) in the first to eighth examples.

TABLE 25

| (1) | D1MAX/G1d |
|---|---|
| (2) | D1MAX/f1 |

TABLE 25-continued

| (3) | f1/ft |
| (4) | $(1 - \beta tv) \times \beta tvb$ |
| (5) | Gvd/TLt |
| (6) | $(1 - \beta tf^2) \times \beta tfb^2$ |
| (7) | Gfd/TLt |
| (8) | G1d/ft |
| (9) | Gsd/TLt |
| (10) | D1MAX/ft |
| (11) | Bfw/fw |
| (12) | ωw |

|  | First example | Second example | Third example | Fourth example |
| --- | --- | --- | --- | --- |
| βtv | 0.024 | 0.027 | 0.011 | 0.039 |
| βtvb | 2.458 | 2.465 | 2.427 | 2.497 |
| βtf | 2.679 | 2.631 | 2.921 | 2.453 |
| βtfb | 0.917 | 0.937 | 0.831 | 1.018 |
| (1) | 0.521 | 0.502 | 0.521 | 0.502 |
| (2) | 0.124 | 0.113 | 0.122 | 0.115 |
| (3) | 0.347 | 0.380 | 0.422 | 0.321 |
| (4) | 2.400 | 2.400 | 2.400 | 2.400 |
| (5) | 0.029 | 0.029 | 0.030 | 0.033 |
| (6) | −5.200 | −5.200 | −5.200 | −5.200 |
| (7) | 0.009 | 0.009 | 0.009 | 0.009 |
| (8) | 0.082 | 0.086 | 0.099 | 0.073 |
| (9) | 0.175 | 0.166 | 0.172 | 0.154 |
| (10) | 0.043 | 0.043 | 0.052 | 0.037 |
| (11) | 0.303 | 0.322 | 0.381 | 0.337 |
| (12) | 6.530 | 6.523 | 7.844 | 5.849 |

|  | Fifth example | Sixth example | Seventh example | Eighth example |
| --- | --- | --- | --- | --- |
| βtv | 0.010 | 0.042 | 0.042 | 0.051 |
| βtvb | 2.424 | 2.504 | 2.506 | 2.529 |
| βtf | 2.946 | 2.419 | 2.410 | 2.314 |
| βtfb | 0.823 | 1.035 | 1.040 | 1.093 |
| (1) | 0.521 | 0.377 | 0.459 | 0.470 |
| (2) | 0.128 | 0.072 | 0.094 | 0.104 |
| (3) | 0.402 | 0.308 | 0.329 | 0.312 |
| (4) | 2.400 | 2.400 | 2.400 | 2.400 |
| (5) | 0.031 | 0.030 | 0.030 | 0.032 |
| (6) | −5.200 | −5.200 | −5.200 | −5.200 |
| (7) | 0.010 | 0.009 | 0.009 | 0.009 |
| (8) | 0.099 | 0.059 | 0.067 | 0.069 |
| (9) | 0.186 | 0.154 | 0.138 | 0.152 |
| (10) | 0.052 | 0.022 | 0.031 | 0.032 |
| (11) | 0.301 | 0.317 | 0.393 | 0.301 |
| (12) | 5.843 | 5.869 | 6.346 | 5.873 |

REFERENCE SIGNS LIST 1 camera (optical apparatus)
ZL (ZL1 to ZL8) zoom optical system
G1 first lens group
G2 second lens group
GL rear lens group
Gv anti-vibration group
Gf focusing group
S aperture stop (aperture)

The invention claimed is:

1. A zoom optical system comprising:
a first lens group having positive refractive power and disposed closest to an object side, the first lens group including a plurality of lenses;
a second lens group; and
a rear lens group, wherein
spaces between the lens groups change at zooming,
the first lens group includes a positive lens closest to the object side, and the following conditional expression is satisfied:

$$0.30 < D1MAX/G1d < 0.70$$

$$0.20 < f1/ft \leq 0.422$$

$$0.113 \leq D1MAX/f1 < 0.133$$

where
D1MAX: maximum air space on an optical axis between two aadjacent lenses in the first lens group, and
G1d: thickness of the first lens group on the optical axis,
f1: focal length of the first lens group, and
ft: overall focal length of the zoom optical system in a telephoto end state.

2. The zoom optical system according to claim 1, wherein the first lens group includes a negative lens closest to an image plane side, and
the following conditional expression is satisfied:

$$0.04 < G1d/ft < 0.15$$

where
G1d: thickness of the first lens group on the optical axis, and
ft: overall focal length of the zoom optical system in a telephoto end state.

3. The zoom optical system according to claim 1, wherein the rear lens group includes a lens group including an aperture, and
the following conditional expression is satisfied:

$$0.05 < Gsd/TLt < 0.30$$

where
Gsd: thickness of the lens group including the aperture on the optical axis, and
TLt: optical total length of the zoom optical system in a telephoto end state, which represents a distance on the optical axis from a lens surface closest to the object side to the image plane.

4. The zoom optical system according to claim 1, wherein the first lens group includes a negative lens disposed closest to an image plane side, and a positive lens adjacently disposed on the object side of the negative lens, and
the following conditional expression is satisfied:

$$0.015 < D1MAX/ft < 0.080$$

where
D1MAX: maximum air space on the optical axis between two adjacent lenses in the first lens group, and
ft: overall focal length of the zoom optical system in telephoto end state.

5. The zoom optical system according to claim 1, wherein the following conditional expression is satisfied:

$$0.15 < Bfw/fw < 0.50$$

where
Bfw: back focus of the zoom optical system in a wide-angle end state, and
fw: overall focal length of the zoom optical system in the wide-angle end state.

6. The zoom optical system according to claim 1, wherein the following conditional expression is satisfied:

$$4.00° < ωw < 10.00°$$

where
ωw: half angle of view of the zoom optical system in a wide-angle end state.

7. The zoom optical system according to claim 1, wherein the rear lens group includes an anti-vibration group configured to move with a movement component in a direction perpendicular to the optical axis, and the anti-vibration group is a positive lens group.

8. The zoom optical system according to claim 1, wherein the rear lens group includes a focusing group configured to move in an optical axis direction at focusing, and the focusing group is a negative lens group.

9. The zoom optical system according to claim 1, wherein a lens group disposed closest to an image plane side in the rear lens group has positive refractive power.

10. The zoom optical system according to claim 1, wherein the first lens group is fixed relative to an image plane at zooming.

11. An optical apparatus comprising the zoom optical system according to claim 1.

12. The zoom optical system according to claim 1, wherein
the rear lens group includes a plurality of lens groups and an aperture,
a lens group in the rear lens group positioned on an image plane side of the aperture is an anti-vibration group configured to move with a component in a direction perpendicular to the optical axis, and
the following conditional expression is satisfied:

$$1.50 < (1-\beta tv) \times \beta tvb < 3.00$$

$\beta tv$: lateral magnification of the anti-vibration group in a telephoto end state, and
$\beta tvb$: lateral magnification of groups on the image plane side of the anti-vibration group in the telephoto end state.

13. The zoom optical system according to claim 12, wherein
the anti-vibration group includes, sequentially from the object side, a positive lens, a positive lens, and a negative lens, and
the following conditional expression is satisfied:

$$0.020 < Gvd/TLt < 0.040$$

where
Gvd: thickness of the anti-vibration group on the optical axis, and
TLt: optical total length of the zoom optical system in the telephoto end state, which represents a distance in the optical axis from a lens surface closest to the object side to the image plane.

14. The zoom optical system according to claim 1, wherein
the rear lens group includes a plurality of lens groups and an aperture,
a lens group in the rear lens group positioned on an image plane side of the aperture is a focusing group configured to move in an optical axis direction at focusing, and
the following conditional expression is satisfied:

$$-8.00 < (1-\beta tf^2) \times \beta tfb^2 < -4.00$$

where
$\beta tf$: lateral magnification of the focusing group in a telephoto end state, and
$\beta tfb$: lateral magnification of groups on the image plane side of the focusing group in the telephoto end state.

15. The zoom optical system according to claim 14, wherein
the focusing group includes, sequentially from the object side, a positive lens and a negative lens, and
the following conditional expression is satisfied:

$$0.005 < Gfd/TLt < 0.015$$

where
Gfd: thickness of the focusing group on the optical axis, and
TLt: optical total length of the zoom optical system in the telephoto end state, which represents a distance on the optical axis from a lens surface closest to the object side to the image plane.

16. The zoom optical system according to claim 1, wherein the rear lens group includes, sequentially from the object side, a first positive lens group, a second positive lens group, and a negative lens group.

17. The zoom optical system according to claim 16, wherein
at least part of at least one of the first positive lens group, the second positive lens group, and the negative lens group is an anti-vibration group configured to move with a movement component in a direction perpendicular to the optical axis, and
at least part of at least one of the first positive lens group, the second positive lens group, and the negative lens group is a focusing group configured to move in an optical axis direction at focusing.

18. A zoom optical system comprising:
a first lens group having positive refractive power and disposed closest to an object side, the first lens group including a plurality of lenses;
a second lens group; and
a rear lens group, wherein
spaces between the lens groups change at zooming,
the first lens group includes a positive lens closest to the object side, and
the following conditional expression is satisfied:

$$0.113 \leq D1MAX/f1 < 0.133$$

$$0.20 < f1/ft \leq 0.422$$

where
D1MAX: maximum air space on an optical axis between two adjacent lenses in the first lens group,
f1: focal length of the first lens group, and
ft: overall focal length of the zoom optical system in a telephoto end state.

19. A method for manufacturing a zoom optical system including a first lens group having positive refractive power and disposed closest to an object side, a second lens group, and a rear lens group, the method comprising:
disposing a positive closest to the object side in the first lens group; and
satisfying the following conditional expression:

$$0.30 < D1MAX/G1d < 0.70$$

$$0.20 < f1/ft \leq 0.422$$

$$0.113 \leq D1MAX/f1 < 0.133$$

where
D1MAX: maximum air space on an optical axis between two aadjacent lenses in the first lens group, G1d: thickness of the first lens group on the optical axis, f1: focal length of the first lens group, and ft: overall focal length of the zoom optical system in a telephoto end state.

\* \* \* \* \*